(12) United States Patent
Boomsma et al.

(10) Patent No.: US 11,393,105 B2
(45) Date of Patent: Jul. 19, 2022

(54) SYSTEM AND METHOD FOR THREE DIMENSIONAL PARTICLE IMAGING VELOCIMETRY AND PARTICLE TRACKING VELOCIMETRY

(71) Applicant: TSI INCORPORATED, Shoreview, MN (US)

(72) Inventors: Aaron Boomsma, New Brighton, MN (US); Dan Troolin, Cambridge, MN (US)

(73) Assignee: TSI Incorporated, Shoreview, MN (US)

(*) Notice: Subject to any disclaimer, the term of this patent is extended or adjusted under 35 U.S.C. 154(b) by 42 days.

(21) Appl. No.: 16/973,510

(22) PCT Filed: Jun. 10, 2019

(86) PCT No.: PCT/US2019/036367
§ 371 (c)(1),
(2) Date: Dec. 9, 2020

(87) PCT Pub. No.: WO2019/241144
PCT Pub. Date: Dec. 19, 2019

(65) Prior Publication Data
US 2021/0241466 A1    Aug. 5, 2021

Related U.S. Application Data

(60) Provisional application No. 62/682,973, filed on Jun. 10, 2018.

(51) Int. Cl.
*G06T 7/246* (2017.01)
*G01P 5/00* (2006.01)
*G06T 7/73* (2017.01)

(52) U.S. Cl.
CPC .............. *G06T 7/248* (2017.01); *G01P 5/001* (2013.01); *G06T 7/74* (2017.01); *G06T 2207/10016* (2013.01); *G06T 2207/30241* (2013.01)

(58) Field of Classification Search
None
See application file for complete search history.

(56) References Cited

U.S. PATENT DOCUMENTS

2010/0134631 A1    6/2010  Voth et al.
2013/0258091 A1*   10/2013 Ozcan ................. G06V 20/695
                                                                348/79

(Continued)

OTHER PUBLICATIONS

International Search Report dated Aug. 30, 2019 for International Application No. PCT/US2019/036367.

(Continued)

*Primary Examiner* — Matthew C Bella
*Assistant Examiner* — Brian D Shin
(74) *Attorney, Agent, or Firm* — Smith, Gambrell & Russell LLP

(57) ABSTRACT

A particle velocimetry system and algorithm are provided for executing a particle reconstruction to determine three-dimensional positions of particles in a particle laden fluid flow from two-dimensional flow images generated by two-dimensional image sensors; generate a three-dimensional particle distribution from the three-dimensional position; and execute a recursive loop for performing further iterations of particle reconstruction and generation of three-dimensional particle distributions, with recursive iterations of particle reconstruction executed with the use of particle property data obtained from the prior executed iteration of particle reconstruction.

20 Claims, 14 Drawing Sheets

(56) References Cited

U.S. PATENT DOCUMENTS

2014/0002617 A1* 1/2014 Zhang .................... G06T 7/292
348/48
2016/0140730 A1 5/2016 Falahatpisheh et al.

OTHER PUBLICATIONS

Written Opinion of the International Searching Authority dated Aug. 30, 2019 for International Application No. PCT/US2019/036367.
Willneff et al., A New Spatio-Temporal Matching Algorithm for 3D-Particle Tracking Velocimetry. [conference] The 9th of International Symposium on Transport Phenomena and Dynamics of Rotating Machinery: Feb. 10-14, 2002. Retrieved online: Aug. 19, 2019; at <URL:https://pdfs.semanticscholar.org/e58a/30334cfbf9881ea77d4e15caadf82b8eeb56.pdf>.

* cited by examiner

Step S201
Peak Finding

Step S202
Peak Finding

Step S203
Support Set Determination

Step S204
Expected Particle Image Fitting

Step S205
Expected Particle Image Fitting

Step S201'
Peak Finding

Step S202'
Peak Finding

Step S203'
Support Set Determination

Step S204'
Enhanced Expected Particle Image Fitting

Step S205'
Enhanced Expected Particle Image Fitting

Step S201'
Peak Finding

Step S202'
Peak Finding

Step S203'
Support Set Determination

Step S204'
Enhanced Expected Particle Image Fitting

Step S205'
Enhanced Expected Particle Image Fitting

SYSTEM AND METHOD FOR THREE DIMENSIONAL PARTICLE IMAGING VELOCIMETRY AND PARTICLE TRACKING VELOCIMETRY

FIELD OF THE INVENTION

The present invention relates to a system and method for identifying and tracking the movement of individual particles within three dimensional particle laden flows, for example, in Particle Imaging Velocimetry (PIV) and Particle Tracking Velocimetry (PTV).

BACKGROUND OF THE INVENTION

Particle Image Velocimetry (PIV) and Particle Tracking Velocimetry (PTV) both utilize image sensors to identify and track the movement of individual particles within three dimensional particle laden flows. In both cases, image sensors are used to generate a series of two dimensional flow images of the three dimensional particle flow, with each flow image containing a multitude of particle images. A flow image is a single two-dimensional image of the three dimensional particle flow, and a particle image is a two-dimensional pixelated image of a particle within a flow image.

In PTV, each particle image receives a velocity vector, and thus needs to be accurately located. In contrast, PIV yields a single velocity vector for an entire region (i.e., window) of the flow image based on particle displacements, foregoing the need for determining individual particle image positions. As less importance is placed on individual particle image positions, PIV is typically characterized by relatively lower resolution demands than PTV, though also a lesser ability to resolve gradients in individual particle images and to accurately identify particle positions. Kahler, C., et al., "On the Uncertainty of Digital PIV and PTV Near Walls", Exp. Fluids 53: 1641-1656, 2012. PTV on the other hand typically requires higher resolution demands, and additional algorithms that can account for imperfections in the particle images, in order to more accurately identify individual particle images and their respective positions.

As PTV assesses the positioning and trajectory of individual particles, there is necessarily a higher burden in this process as well as increased potential for errors. Two particular errors that are often encountered in PTV are the erroneous determination of "ghost" particles and particle image overlap error. Ghost particles occur when the imperfections inherent in pixelated particle images lead to the calculation of an erroneous particle position where no particle image in fact exists. Particle image overlap error occurs when the line of sight between a particle and an image sensor is partially obscured by another particle, with a subsequent failure to distinguish between the two separate images such that they are instead calculated as a single particle image. Both the occurrence and the percentage of ghost particles and particle image overlap increase as the particle density increases.

SUMMARY OF THE INVENTION

The present invention is inclusive of particle velocimetry (PIV or PTV) system and a particle velocimetry algorithm for identifying and tracking the movement of individual particles within three dimensional particle laden flows, for example, in Particle Imaging Velocimetry (PIV) and Particle Tracking Velocimetry (PTV).

A particle velocimetry system includes an input for receiving imaging data from a plurality of two-dimensional image sensors adapted for generating two-dimensional flow images of a three-dimensional particle laden fluid flow; a memory storing a particle velocimetry algorithm for tracking the movement of particles in the particle laden fluid flow based on the flow images received from the plurality of image sensors; and a processor programmed to execute the particle velocimetry algorithm to track the movement of particles in the particle laden fluid flow based on the flow images received from the image sensors.

The processor executes a particle reconstruction routine to determine three-dimensional positions of particles in the particle laden fluid flow from the flow images received from the image sensors; generates a three-dimensional particle distribution from the three-dimensional position data determined by the particle reconstruction routine; and performs a recursive loop for iteratively executing the particle reconstruction routine and the generation of three-dimensional particle distributions. The recursive iterations of the particle reconstruction routine are executed with the use of particle property data obtained from the prior executed iteration of the particle reconstruction routine and/or the generation of three-dimensional particle distributions. Property data includes particle location, particle size, particle shape, and particle intensity.

The processor performs particle identification to identify two-dimensional particle images in the flow images received from the plurality of image sensors, and to determine two-dimensional positions of the identified particle images; performs particle matching to match a plurality of particle images identified in a plurality of corresponding flow images on the basis that the matched particle images are determined to correspond to a common particle in the particle laden fluid flow; and performs particle triangulation to determine three-dimensional positions of particles in the particle laden fluid flow based on the two-dimensional positions of matched particle images.

The processor, when performing particle identification, identifies target regions in the flow images that are determined to contain a particle image based on a first intensity value of pixels in the flow images; identifies in the target regions local peaks that are determined to represent a particle based on a second intensity value of pixels in the flow images; defines support sets of surrounding pixels around the identified local peaks based on commonalities in intensity values in pixels around the local peaks; adds, in each support set, an expected particle image based on bounds of the respective support set and location of the local peak in the respective support set; and initializes each expected particle image to assign expected particle properties thereto based on properties of pixels at the respective local peak and support set (e.g., max and/or average pixel intensity, intensity-weighted sub-pixel location).

The processor, when matching particle images, associates the expected particle properties of a given particle image with each other particle image that the given particle image is matched with. Likewise, when triangulating particle images, the processor associates the expected particle properties of matched particle images with a three-dimensional particle location triangulated from the matched particle images. The expected particle properties include at least one of particle location, particle size, particle shape, and particle intensity.

When executing a recursive loop, the processor may extrapolate a two-dimensional particle trajectory based on a series of associated particle images at successive points in time to identify a two-dimensional particle position of an expected particle image at yet other point in time; and may then associate expected particle properties of a particle image at a given point in time in the two-dimensional trajectory with pixels at the two-dimensional particle position identified by extrapolation of the two-dimensional particle trajectory. Thereafter, when performing a recursive iteration of identifying local peaks, the processor may identify a local peak at a pixel based on expected particle properties from a prior iteration of particle reconstruction that have been associated with that pixel based on the extrapolation of the two-dimensional particle trajectory. Alternatively, when performing a recursive iteration of fitting expected particle images, the processor may add a second expected particle image in a support set having another particle image therein based on expected particle properties from a prior iteration of particle reconstruction that have been associated with pixels in the support region based on the extrapolation of the two-dimensional particle trajectory. As a further alternative, the processor may initialize an expected particle image to assign expected particle properties thereto based on properties of pixels at the respective local peak and support set, wherein the properties of pixels at the respective local peak and support set are inclusive of expected particle properties from a prior iteration of particle reconstruction that have been associated with those pixels based on the extrapolation of the two-dimensional particle trajectory.

In other instances, when executing a recursive loop, the processor may project a previously triangulated three-dimensional particle position to identify a two-dimensional particle position of an expected particle image; and may then associate expected particle properties of the three-dimensional particle position with pixels at the two-dimensional particle position identified by projection of the three-dimensional particle position. Thereafter, when performing a recursive iteration of identifying local peaks, the processor may identify a local peak at a pixel based on expected particle properties from a prior iteration of particle reconstruction that have been associated with that pixel based on the projection of the three-dimensional particle position. Alternatively, when performing a recursive iteration of fitting expected particle images, the processor may add a second expected particle image in a support set having another particle image therein based on expected particle properties from a prior iteration of particle reconstruction that have been associated with pixels in the support region based on the projection of the three-dimensional particle position. As a further alternative, the processor may initialize an expected particle image to assign expected particle properties thereto based on properties of pixels at the respective local peak and support set, wherein the properties of pixels at the respective local peak and support set are inclusive of expected particle properties from a prior iteration of particle reconstruction that have been associated with those pixels based on the projection of the three-dimensional particle position.

The processor may be programmed to implement the particle velocimetry algorithm to execute an initial iteration of the particle reconstruction routine and generation of a three-dimensional particle distribution, and at least one recursive iteration of the particle reconstruction routine and generation of a three-dimensional particle distribution. In some instances the processor may be programmed to execute recursive iterations of the particle reconstruction routine and generation of a three-dimensional particle distribution for a predetermined number of iterations, or until a threshold variation in positional data of the three-dimensional particle distribution is reached.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The following disclosure discusses the present invention with reference to the examples shown in the accompanying drawings, though the invention is not limited thereto.

A 3D-PTV system is presented that employs a recursive PTV algorithm that enhances particle reconstruction by initializing recursive iterations with information obtained from prior iterations. Enhance particle reconstruction results in improved accuracy and reliability in identifying particle image locations and trajectories, improving overall performance of the 3D-PTV system.

Figure 1:
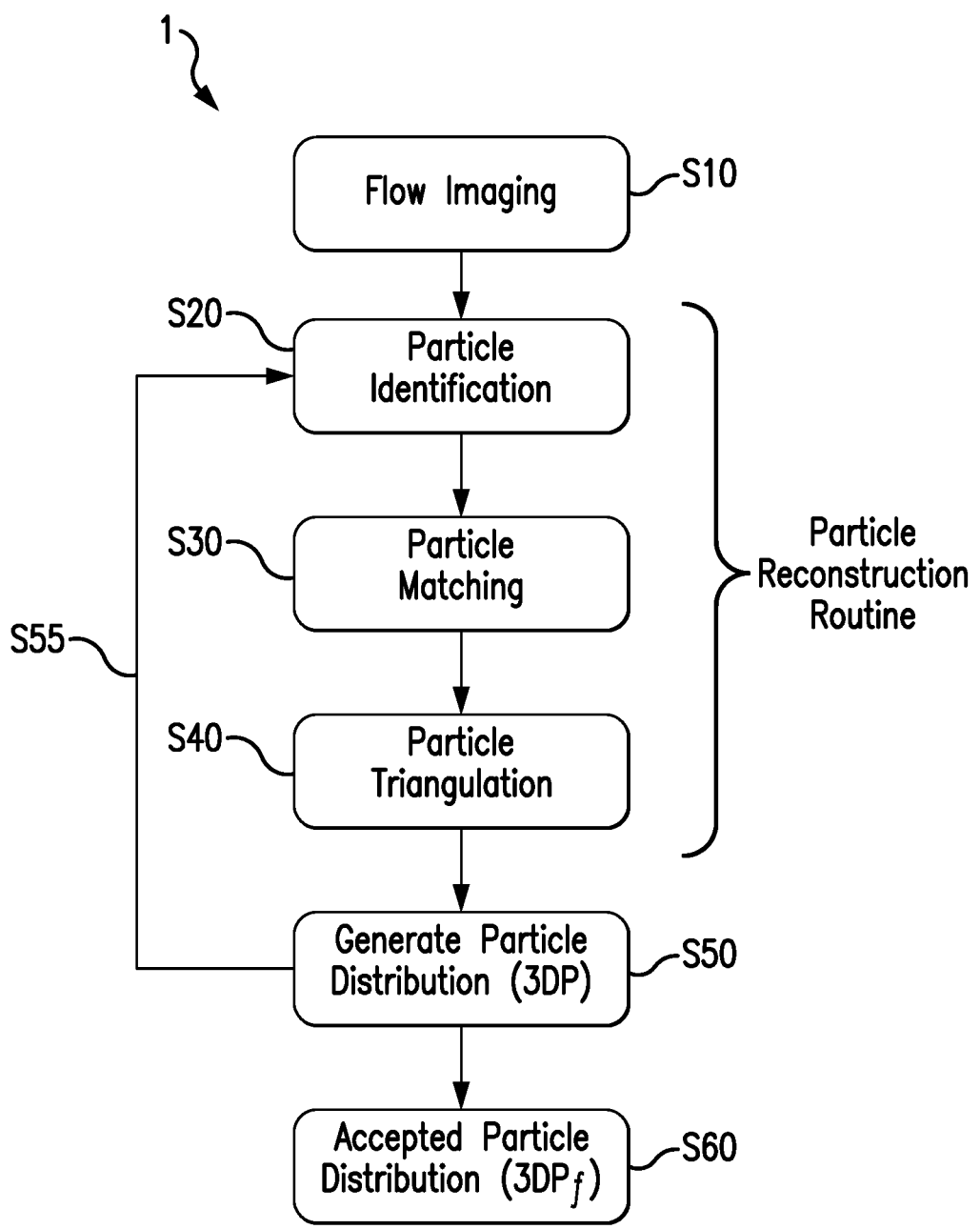
FIG. 1 shows one example of a PTV algorithm according to the present invention.

FIG. 1 provides one example of a recursive PTV algorithm 1 according to the present invention. In this example, the algorithm 1 includes a Step S10 in which flow imaging is performed with multiple image sensors imaging a particle laden fluid flow (particle flow) that flows through a predetermined volume to generate static flow images thereof. In a subsequent particle identification Step S20, the flow images generated from the image sensors are processed to identify individual particle images in each of the flow images, including the two dimensional positions of the identified particle images. Particle matching is then performed in a Step S30 to match corresponding particles from separate flow images that were generated by the several image sensors at a common moment in time (a point in time), and particle triangulation is performed to calculate the three dimensional positions of matched particle images in a Step S40. The triangulated particle positions for each set of flow images that were generated for a common point in time are then combined to generate a three dimensional particle (3DP) distribution for the corresponding point in time in Step S50. On an initial execution of the PTV algorithm 1, the EPI fitting sub-process in the particle identification Step S20 is performed with reliance only on intensity differentials and particle data that can be obtained from a support set of surrounding pixels, and the particle distribution generation Step S50 will yield an initial 3DP ($3DP_i$) distributions for the respective points in time for which flow images were generated. Following the initial execution of Steps S20-S50, a recursive loop S55 will be executed, such that Steps S20-S50 are repeated. The recursive performance of particle identification Step S20 is performed with the additional use of particle image data from the $3DP_i$ distribution produced in the prior performance of Step S50, so as to aid in a more accurate and reliable identification of individual particle images in the several flow images. Recursive Steps S30-S50 are then perform particle matching and triangulation using the enhanced results from recursive Step S20 to generate a recursive 3DP ($3DP_r$) distribution. The recursive loop S55 may be repeated one or more times to yield further improved $3DP_r$ distributions (e.g., $3DP_r'$, $3DP_r''$, etc.), with each repetition of the recursive loop using data from the 3DP distribution obtained from the immediately preceding iteration of Steps S20-S50.

When repetition of the recursive loop S55 ceases, the $3DP_r$ distributions obtained from the final execution of Step S50 will then be accepted as the final 3DP ($3DP_f$) distributions in a Step S60. Repetition of the recursive loop S55 may be set to terminate based on a predetermined number of executions, or based on a predetermined threshold. For example, if based on a predetermined threshold, the threshold may be set based on an average change in particle image positions between an immediately preceding 3DP distribution (e.g., $3DP_r$) and a present 3DP distribution (e.g., $3DP_r'$).

The three-dimensional locations from the $3DP_f$ distributions are then used to track movement and trajectory of particles in the particle flow, with particle trajectories calculated by fitting a polynomial to individual particles based on the flow characteristics of the particle flow, for example, as taught by Willneff, J., et al., "A New Spatio-Temporal Matching Algorithm for 3D-Particle Tracking Velocimetry", 9th Intl. Symp. On Transport Phenomena and Dynamics of Rotating Machinery, 2002.

In Step S10, a particle flow is imaged by a number of image sensors S0-S3 over an observation period during which the particle flow flows through a predetermined volume. The several image sensors S0-S3 are each oriented at a different observation angle relative to the particle flow, with each image sensor generating several two-dimensional flow images over successive points in time—each individual flow image corresponding to the view of the flow image from the perspective of the corresponding image sensor S0-S3 at a single point in time. The flow images are generated over the observation period, with each image sensor S0-S3 generating a flow image at a common point in time as each other image sensor. As a result, for each point in time there will be a set of flow images, each flow image set being composed of a number of two-dimensional flow images that corresponds with the number of image sensors S0-S3, and each flow image in a flow image set representing an image of the particle flow at the same point in time, though each from the unique observation angle of the respective image sensor S0-S3.

In Step S20, each individual flow image is processed to identify individual particle images therein. The flow images generated by the image sensors are two-dimensional pixelated images, with the imaged particles represented by discrete pixels, both in terms of sensitivity and size. The pixelated particle images in the flow images are imperfect representations of the actual particles in the three-dimensional particle flow. To address these imperfections, particle location and size processing is performed in the particle identification step to enhance accuracy of the overall particle reconstruction—this includes three sub-processes: [1] peak finding; [2] support set determination; and [3] expected particle image (EPI) fitting.

Figure 3A:
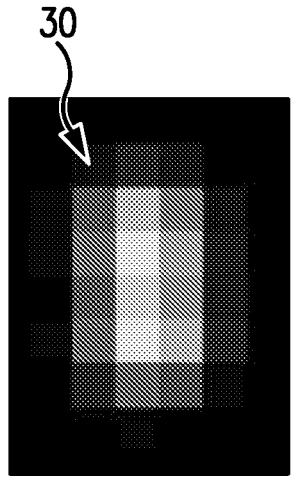
FIGS. 3A-3E show an example of the particle identification sub-processes in FIG. 2.
Figure 3B:
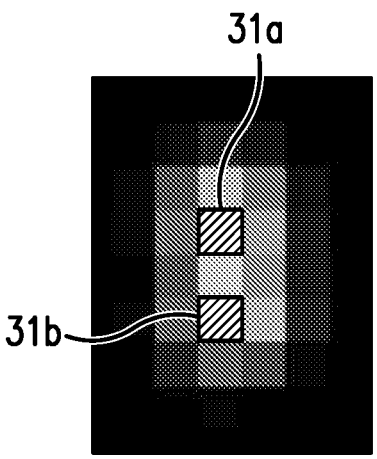

Peak finding sub-process is performed in two Steps S201/S202 through use of one or more algorithms that identify and distinguish pixel intensities in a flow image, which may include assessing intensity values of individual pixels and/or intensity differentials between adjacent pixels. In an initial Step S201, a flow image is scanned to identify a number of target regions that are each characterized by a pixel intensity in excess of a first threshold, which is indicative that one or more particle images are likely present in that region. FIG. 3A presents one example of a single target region 30, as would be found in a flow image. In a Step S202, there is then identified within each target region one or more local peaks that are characterized by a pixel intensity in excess of a second threshold, which is indicative that a particle image is likely present at that specific location within the target region. FIG. 3B presents one example in which two local peaks 31a/31b have been identified in the target region 30 of FIG. 3A.

In a peak finding sub-process such as the foregoing, the initial threshold for identifying target regions in Step S201 may simply be a minimum intensity value that is determined in advance to distinguish between a non-particle background and a particle surface, thereby indicating a particle is at or near to the pixel having an intensity value in excess of the preset minimum value. The second threshold for identifying local peaks in Step S202 may be set to either a second minimum intensity value or a minimum intensity differential value. If using a second minimum intensity value, the second threshold will be set to an intensity value that is determined in advance to be indicative of a central portion of a particle, thereby indicating that a local peak of a particle is at or near to the pixel having an intensity value in excess of the preset minimum value. If using a minimum intensity differential value, the second threshold will be set to an intensity differential value that is determined in advance to distinguish between a peripheral edge of a particle and a central portion of a particle, indicating that a local peak of a particle is at or near to the pixel having an intensity differential value, relative to surrounding pixel intensities, that is in excess of the preset minimum value.

Figure 3C:
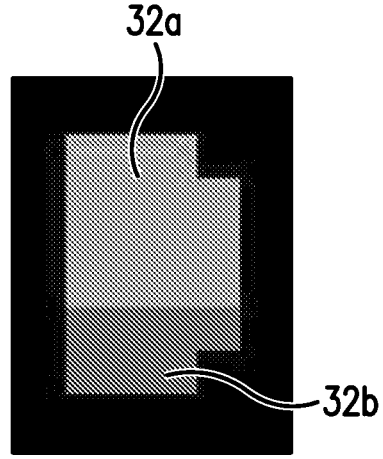

After identifying target regions and local peaks, a support set determination is then performed in a Step S203 to segment each target region into distinct support sets with defined boundaries. Each support set is defined relative to an identified local peak and represents a collection of binarized connected components, with each support set being distinct from one another. FIG. 3C shows an example in which two separate support sets 32a/32b have been defined around the local peaks 31a/31b identified in FIG. 3B. In one example, the support sets are defined through a segmentation method using an Erosion Dilation Thresholding (EDT) algorithm. Preferably, the EDT algorithm dynamically preserves peaks by recursively applying an 8-neighbored erosion kernel to the image, such that only local peaks (with varying intensity) will remain. From those local peaks, there is applied an iterative dilation with special handling at neighboring boundaries to create respective support zones around the individual local peaks. In this way, the EDT algorithm separates individual particles from one another as much as possible while grouping corresponding pixels within the same support set (i.e., pixel segmentation). One example of a suitable EDT algorithm for defining support sets is disclosed by Cardwell, N., et al. "A Multi-Parametric Particle-Paring Algorithm for Particle Tracking in Single and Multiphase Flows", Meas. Sci. Tech., 22, 2011.

Figure 3D:
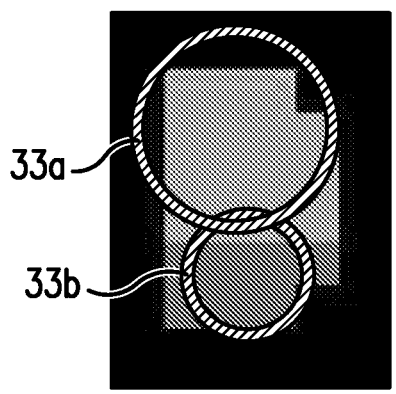
Figure 3E:
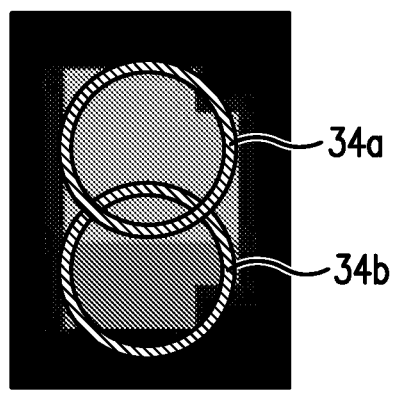

Once support sets are defined, expected particle image (EPI) fitting is performed in two Steps S204/S205 to approximate a location of particle images in each support set of each target region. In an EPI Initializing Step S204, an EPI is added to each support set, with each EPI originating from a local peak of the respective support set. FIG. 3D shows an example of two EPI's 33a/33b added to the support sets 32a/32b of FIG. 3C based on the local peaks 31a/31b of FIG. 3B. Each EPI is initialized with one or more expected particle properties that are determined from the support set around a local peak. Such expected particle properties include, though are not limited to: particle location, particle size, particle shape, and particle intensity (or intensity profile—e.g., an intensity gradient). FIG. 3D shows EPI'S 33a/33b with initialized particle size (denoted by diameter), where EPI 33a has been initialized with a larger size than 33b due to properties of the local support set. In a subsequent EPI Fitting Step S205, the initialized EPI's 33a/33b of FIG. 3D are fit to a particle image model using pixels in each EPI's support set to their final (of the current recursion) expected particle property values as is illustrated via EPI's 34a/34b of FIG. 3E.

In an initial performance of the particle identification Step S20, expected particle properties used in the EPI Initializing Step S204 may be calculated with information from the flow image itself, particularly the surrounding pixels forming the support sets around the local peaks. In Step S205, expected particle properties may be determined via a Levenberg-Marquardt nonlinear solver using one or more two-dimensional Gaussian particle image models as minimization functions. The least squares solver is initialized with information from Step S204, i.e., the number of expected particle images within each support set (i.e., the number of minimization functions) and initializations of location, size, shape, and intensity. However, it is not required that particle image location, size, shape, and/or intensity be already known—instead, a reasonable estimation may be used for initialization and the least squares solver may then calculate these parameters.

As discussed further below, recursive performances of the particle identification Step S20, and thus EPI Initializing Step S204, will benefit from additional expected particle properties obtained from corresponding particle images.

Following particle identification, particle images that are determined to correspond to a common real particle in the particle flow are matched in a particle matching Step S30. That is, for each point in time, there will be a flow image set that includes a flow image as generated by each image sensor S0-S3 at that point in time. Ideally, a particle imaged in the particle flow at a given point in time will appear in each flow image of the flow image set for that same point in time, with the relative positioning of the particles appearing slightly different based on the different perspectives of the differently oriented image sensors S0-S3. In particle matching, several particles images that represent different perspective views of a common particle, as present in the several flow images of a common flow image set, are matched with one another.

Figure 4A:
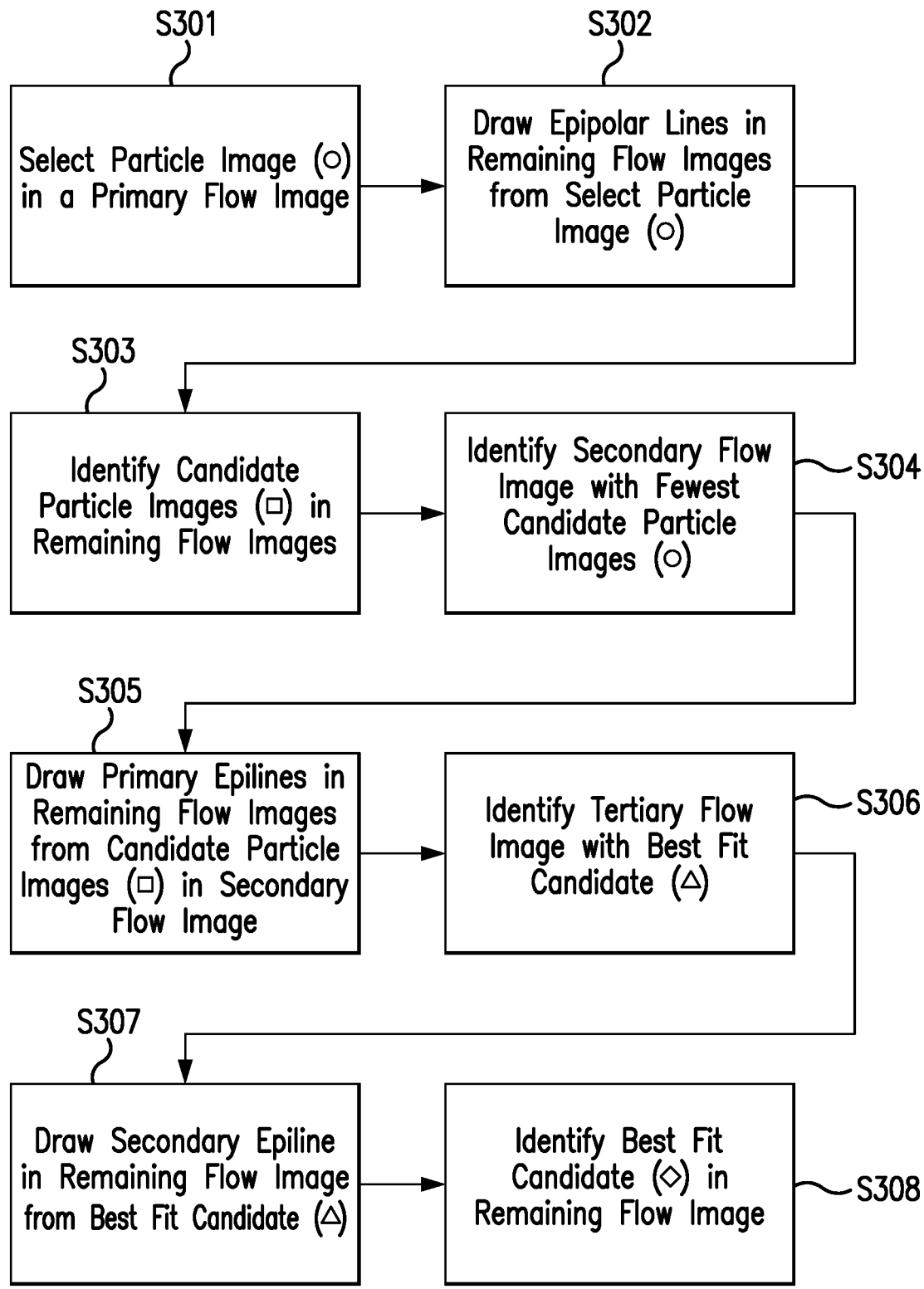
FIG. 4A shows a first particle matching sub-process for use in the algorithm of FIG. 1.

In one example, particle matching is performed by selecting a particle image in a first flow image of a flow image set, and setting reference lines (epipolar lines and epilines) through each of the other corresponding flow images in the same flow image set. FIG. 4A presents a series of steps for performing particle matching in this manner, and FIGS. 5A-5D present corresponding illustrations thereof. FIGS. 5A-5D represent four separate flow images in a common flow image set, each flow image representing a different perspective image of the same particle flow at the same point in time, as generated by four separate image sensors S0-S3 that each have a different orientation angle to the particle flow.

Figure 5A:
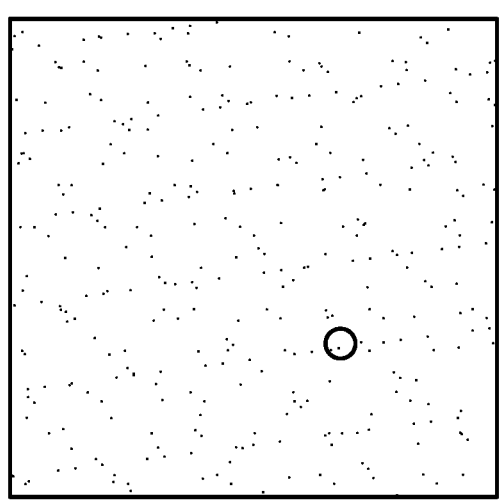
FIGS. 5A-5D show an example of the particle matching sub-process in FIG. 4A.
Figure 5B:
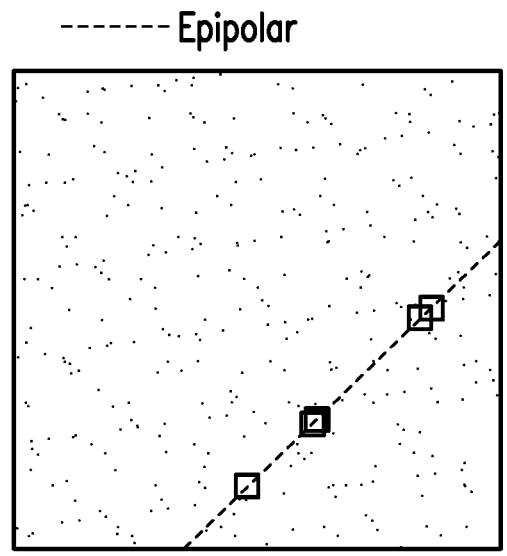
Figure 5C:
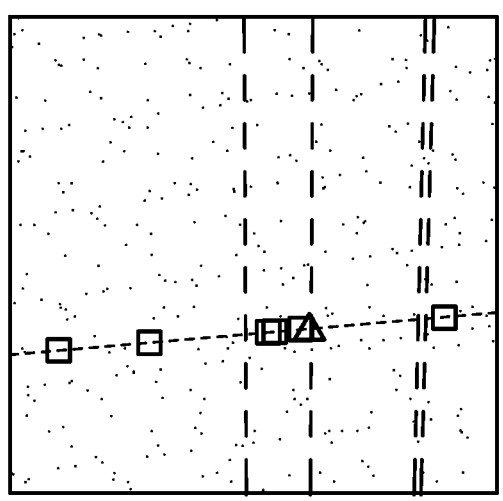
Figure 5D:
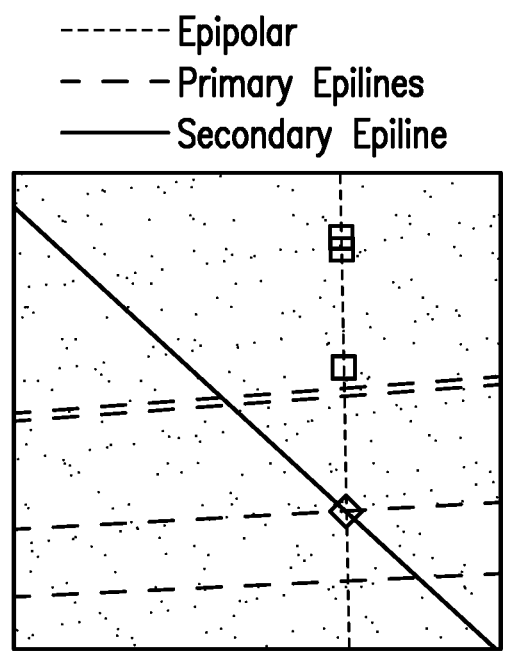

In a first Step S301, and as shown in FIG. 5A, a selected particle image (○) is chosen for matching with corresponding particle images in the other flow images (FIGS. 5B-5D) in the same flow image set. In a Step S302, epipolar lines are then drawn in the remaining flow images (FIGS. 5B-5D) based on the selected particle image (○) from the first flow image (FIG. 5A). In a Step S303, candidate particle images (□) that are most likely to correspond to the selected particle image (○) are identified in each of the other flow images (FIGS. 5B-5D) based on a predetermined tolerance relative to the epipolar line in each flow image. In a Step S304, the flow image having the fewest candidate particle images (FIG. 5B in this instance), is treated as a secondary flow image and primary epilines are then drawn in the remaining flow images (FIGS. 5C-5D) for each candidate particle (□) that was identified in the secondary flow image (FIG. 5B) in a Step S305. In a Step S306, the candidate particle images (□) in the remaining flow images (FIGS. 5C-5D) are narrowed based on a predetermined tolerance relative to both the epipolar line and the several primary epilines in the respective flow images, and a best fit candidate (▲) is identified between those remaining flow images, as shown in this instance in FIG. 5C, and that flow image is treated as the tertiary flow image. In a Step S307, a secondary epiline is then drawn in the remaining flow image (FIG. 5D in this instance) based on the best fit candidate (▲) from the tertiary flow image (FIG. 5C), and a candidate particle image that best fits within predetermined tolerances to the epipolar line, the several primary epilines, and the secondary epiline is selected as the best fit candidate (◇) for that flow image in a Step S308.

When performing particle matching, each particle image is restricted to contributing to one particle match, with priority given to matching candidates based on minimum projection error. Once best fit candidate particle images have been selected in the several flow images, that combination of particle images is treated as representing a common particle in the three-dimensional particle flow. Thus, in keeping with the example illustrated by FIGS. 5A-5D, the particle images designated by the (○) in FIG. 5A, the (▲) in FIG. 5C and the (◇) in FIG. 5D will be understood as each representing different images of a common particle in the three-dimensional particle flow. Though not shown by a special designation in the figure, the particle image in FIG. 5B that corresponds to the same common particle in the three-dimensional particle flow will be known based on the corresponding epiline that was created therefrom and which led to identification of the designated particle images in FIGS. 5C and 5D.

Figure 4B:
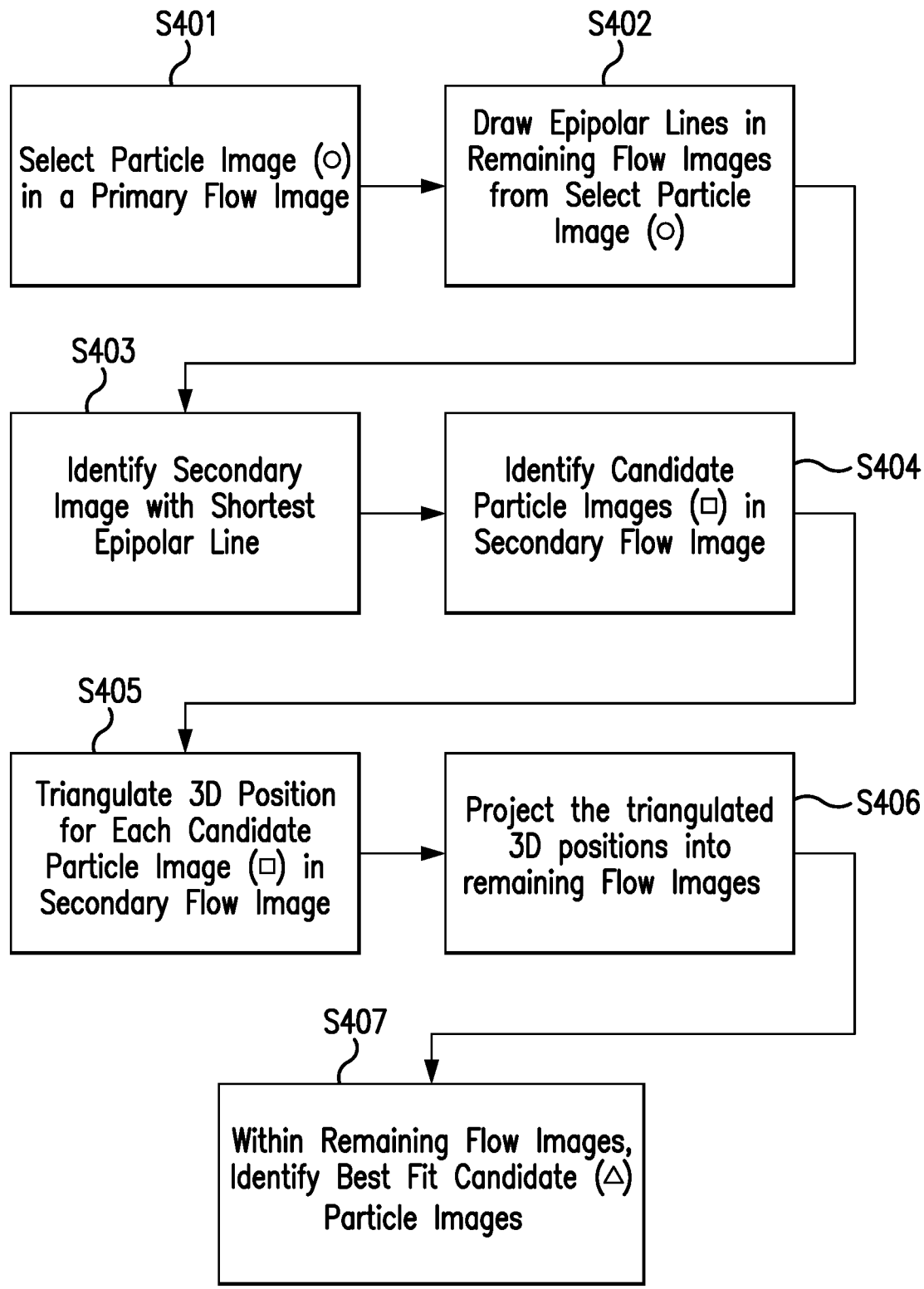
FIG. 4B shows a second particle matching sub-process for use in the algorithm of FIG. 1.

In a second example, particle matching is again performed by selecting a particle image in a first flow image of a flow image set, and setting reference lines (epipolar lines) through each of the other corresponding flow images in the same flow image set. FIG. 4B presents a series of steps for performing particle matching in this second example, and FIGS. 5E-5H present corresponding illustrations thereof. As with the former example, FIGS. 5E-5H represent four separate flow images in a common flow image set, each flow image representing a different perspective image of the same particle flow at the same point in time, as generated by four separate image sensors S0-S3 that each have a different orientation angle to the particle flow.

Figure 5E:
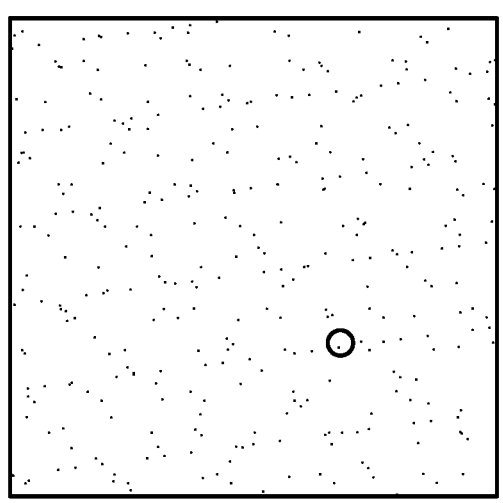
FIGS. 5E-5H show an example of the particle matching sub-process in FIG. 4B.
Figure 5F:
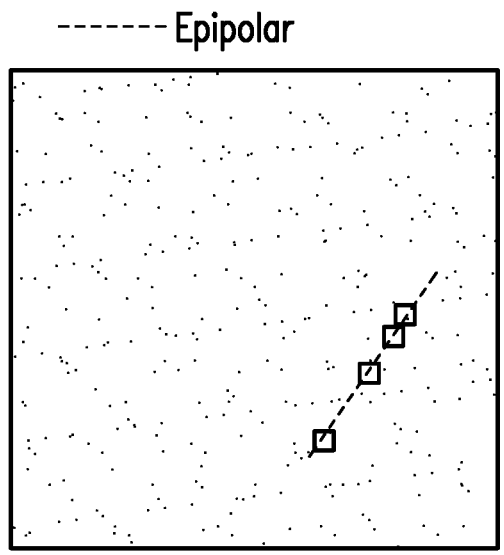
Figure 5G:
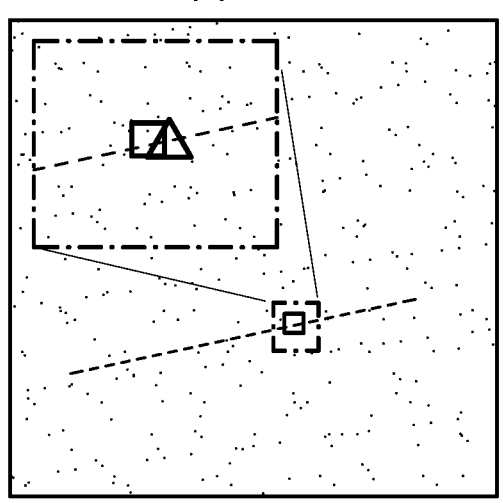
Figure 5H:
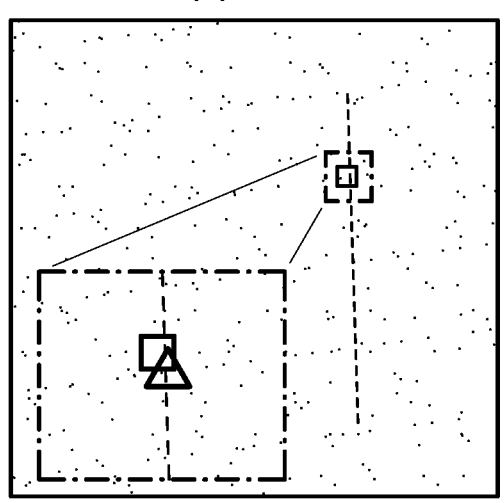

In a first Step S401, and as shown in FIG. 5E, a selected particle image (○) is chosen for matching with corresponding particle images in the other flow images (FIGS. 5F-5H) in the same flow image set. In a Step S402, epipolar lines are then drawn in the remaining flow images (FIGS. 5F-5H) based on the selected particle image (○) from the first flow image (FIG. 5E). In a Step S403, the flow image with the shortest epipolar line is treated as a secondary flow image (FIG. 5F). In a Step S404, candidate particle images (□) that are most likely to correspond to the selected particle image (○) are identified in the secondary flow image (FIG. 5F) based on a predetermined tolerance relative to the epipolar line. In a Step S405, for each candidate particle (□) that was identified in the secondary flow image, a three-dimensional position is then triangulated using the selected particle image (○) in combination with the respective candidate particle (□). In a Step S406, the corresponding three-dimensional positions (from Step S405) are likewise projected into the remaining flow images (FIGS. 5G-5H). In a Step S407, within the remaining flow images (FIGS. 5G-5H), there is then identified a best fit candidate (▲) based on a predetermined tolerance relative to the projected location and particle images within the respective flow image.

In this second example, each particle image is again restricted to contributing to one particle match, with priority given to matching candidates based on minimum projection error. Once best fit candidate particle images have been selected in the several flow images, that combination of particle images is treated as representing a common particle in the three-dimensional particle flow. Thus, in keeping with the example illustrated by FIGS. 5E-5H, the particle images designated by the (○) in FIG. 5E and the (▲) in FIGS. 5G-5H will be understood as each representing different images of a common particle in the three-dimensional particle flow. Though not shown by a special designation in the figure, the particle image in FIG. 5F that corresponds to the same common particle in the three-dimensional particle flow will be known based on the corresponding projections that were created therefrom and which led to identification of the designated particle images in FIGS. 5G and 5H.

Figure 6:
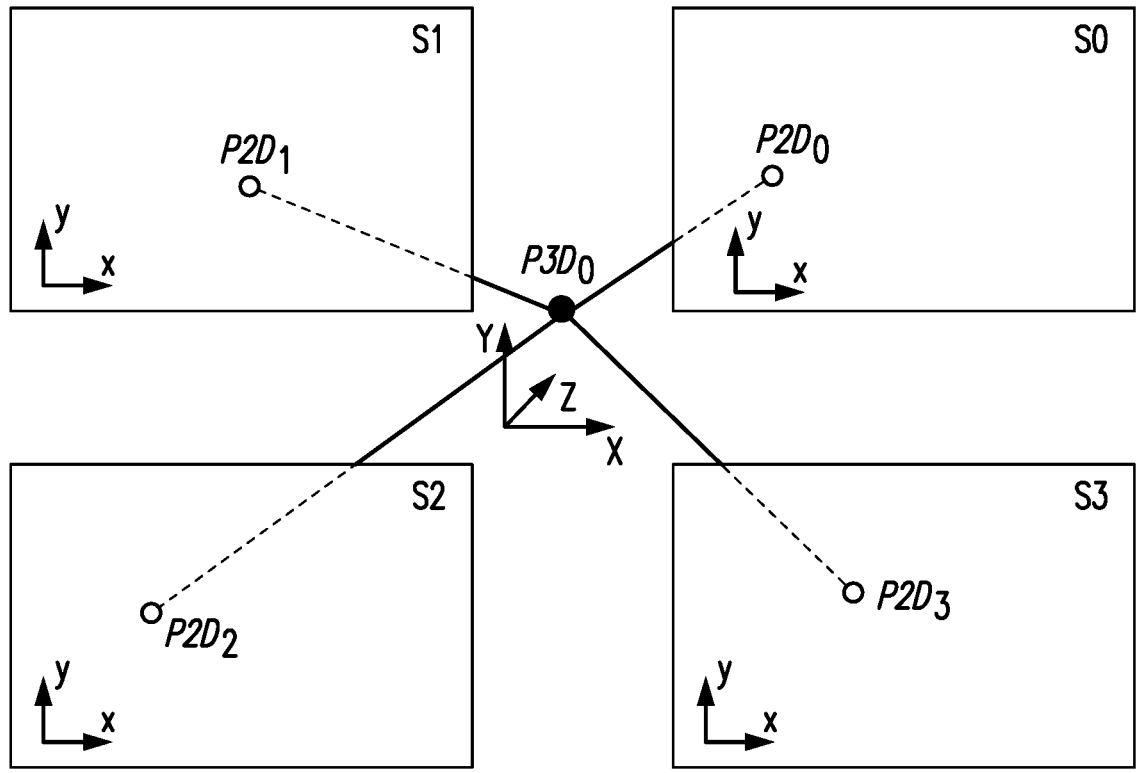
FIG. 6 shows an example of particle triangulation in the algorithm of FIG. 1.

Once corresponding particle images have been matched in the several flow images of a flow image set, with that combination of particle images then representing a common particle in the three-dimensional particle flow, the two-dimensional locations of those individual particle images are then used to triangulate a three-dimensional position of the actual particle, as illustrated in FIG. 6. Triangulation is performed in the PTV system, for example, by a bundle adjustment method, such as that taught by Triggs, B., et al., "Bundle Adjustment—A Modern Synthesis", Vision Algorithms '99, pp. 298-372, 2000. As illustrated in FIG. 6, the two-dimensional locations of the corresponding particle images ($P2D_0$-$P2D_3$), as matched from the separate flow images (as in FIGS. 5A-5D) that were generated at a common point in time from the separate image sensors (S0-S3), are used to determine a three-dimensional location of the actual particle ($P3D_0$) in the particle flow. Any projection error introduced between the two-dimensional positions of the separate particle images and a finite three-dimensional position of the actual particle are minimized through a least squares solver. In recursive executions the matching tolerances are increased so as to match more particle images in later recursions (those matches likely include overlapped particle images) and to reduce the number of ghost particles.

In addition to calculating a three-dimensional position of the actual particle from the two-dimensional positions of the particles images, the expected particle properties identified relative to the several particle images (e.g., based on data from the respective support sets of the separate particle images) are combined as expected particle properties of the actual particle.

Following triangulation, the three dimensional positions calculated for each particle at a corresponding point in time are then combined in a Step S50 to generate a three-dimensional particle (3DP) distribution for that corresponding point in time. An initial performance of the particle distribution generations Step S50 will provide an initial 3DP ($3DP_i$) distribution.

So as to obtain a more accurate and reliable 3DP distribution, a recursive loop S55 is executed in which the particle identification, particle matching, particle triangulation, and generation of particle distribution steps S20-S50 are repeated. In the first execution of the recursive loop S55 (i.e., a second iteration of Steps S20-S50), particle identification S20 is repeated with the benefit of data from the $3DP_i$ distribution—this includes the calculated three-dimensional position of the actual particle as well as the combined expected particle properties associated therewith, as taken from the individual particle images in the prior iteration that yielded the $3DP_i$ distribution. Each successive execution of the recursive loop (if any) will likewise be performed with use of the information obtained from the immediately prior iteration of Steps S20-S50 and the 3DP distribution obtained thereby (e.g., $3DP_r'$, $3DP_r''$, etc.).

In execution of the recursive loop S55, the three-dimensional position data from a prior 3DP distribution may be used to enhance identification of target regions and/or local peaks within the target regions (i.e., recursive performance of Steps S201-S202). The three-dimensional position data and the expected particle properties from a prior 3DP distribution may also be used for adding and initializing EPI's defined in the support sets (i.e., recursive performance of Step S204) so as to improve identification of particle images. Such recursive executions of these steps in the PTV algorithm 1 enhances the accuracy and reliability of overall particle reconstruction (e.g., recursive performance of particle identification, particle matching, particle triangulation—Steps S20-S40), and decreases the occurrence of errors, including ghost particle errors and particle image overlap errors.

Figure 7A:
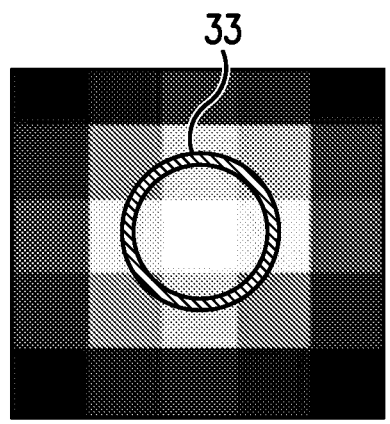
FIGS. 7A and 7B show an example of particle image overlap.
Figure 7B:
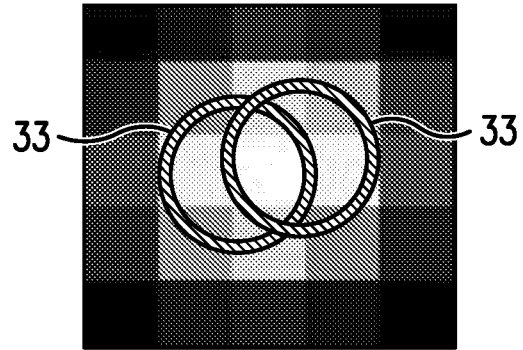

Particle image overlap occurs when the line of sight between a particle and an image sensor is partially obscured by another particle, presenting the possibility that two separate particle images generated by the image sensor might be mistaken for a single particle image. FIGS. 7A-7B illustrate an occurrence of particle image overlap. In both figures, there is a single region of interest having two overlapping particle images. Particle image overlap ratio (OVR) is defined as:

$$OVR(\%) = \frac{D - d}{D}$$

where D is the particle image diameter and d is the distance between centroids of two neighboring particle images. The particle image overlap in FIGS. 7A and 7B has an OVR=73%, with FIG. 7A illustrating an incorrect particle image identification with only a single EPI 33 fit to the region, whereas FIG. 7B illustrates a correct particle image identification with two EPIs 33 fit to the region. The error in FIG. 7A results in mistaken identification of only a single particle image where there are in fact two particle images.

Particle image overlap errors may lead to significant errors in the computation of a particle distribution. For example, failure to identify one of the two overlapping particle images may result in loss of positional and trajectory data relative to the omitted particle image, which may in turn result in difficulties in locating corresponding particle images in other flow images. Furthermore, because the single particle image in FIG. 7A is based on information from two separate particles, that single particle image may be associated with incorrect information as to particle location, size, shape, and intensity thereby producing erroneous expected particle properties. The significance of these errors is further compounded with each occurrence thereof.

The PTV algorithm 1, with the recursive loop S55, lessens the potential for particle image overlap errors by improving accuracy in particle reconstruction through enhanced particle identification and enabling the fitting of multiple EPI's in a single support set. Multiple EPI fitting is especially advantageous for high overlap ratios, and the efficacy of multiple EPI fitting is improved by the recursive execution of Steps S20-S50 as the information available from prior iterations of particle reconstruction may be used to inform the EPI within a support set such that a more accurate and reliable determination may be made of overlapping particle images.

Figure 2:
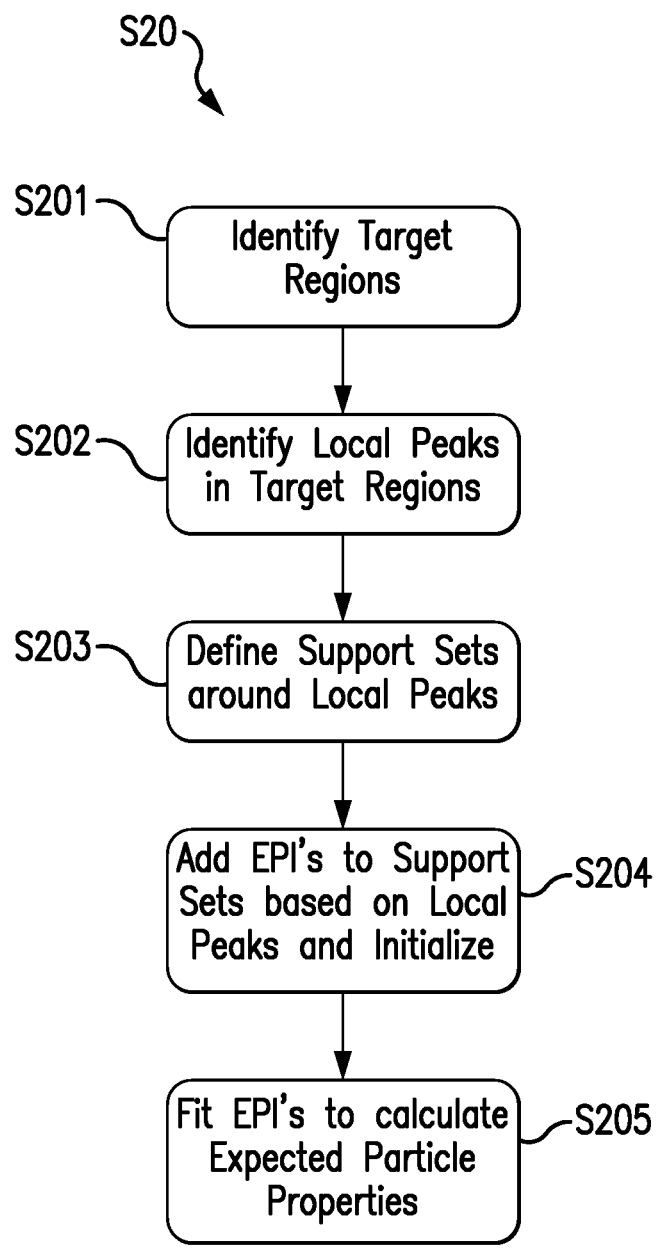
FIG. 2 shows an example of particle identification sub-processes in the algorithm of FIG. 1.
Figure 8A:
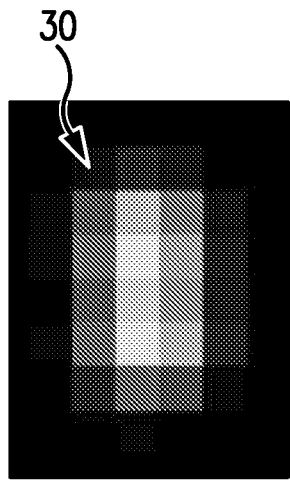
FIGS. 8A-8E show another example of the particle identification sub-processes in FIG. 2.
Figure 8B:
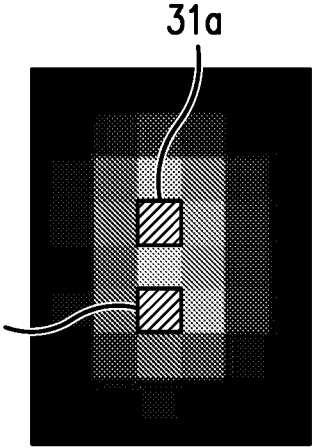
Figure 8C:
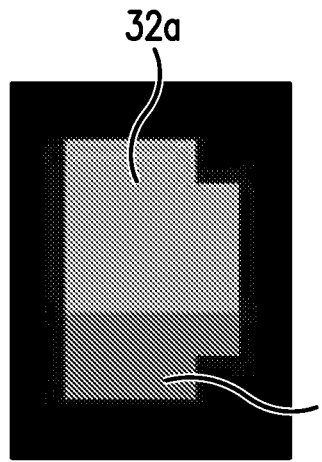
Figure 8D:
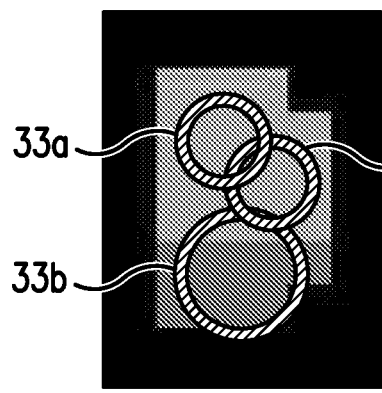
Figure 8E:
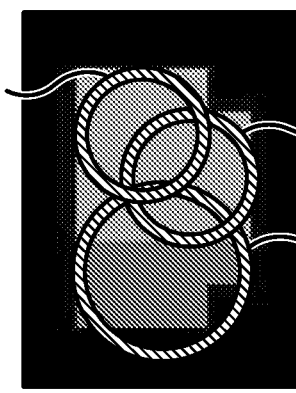
Figure 9A:
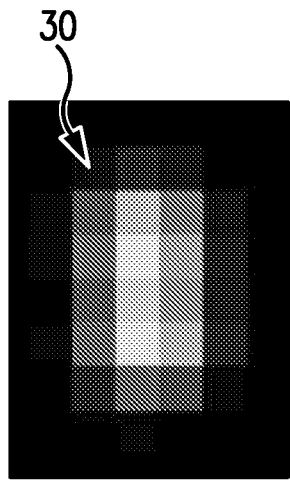
FIGS. 9A-9E show another example of the particle identification sub-processes in FIG. 2.
Figure 9B:
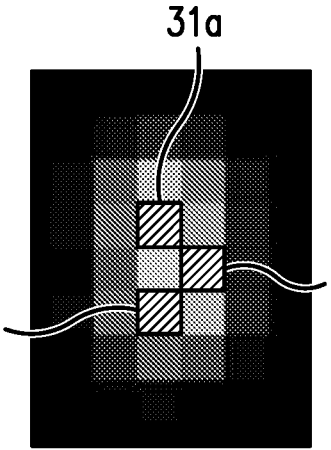
Figure 9C:
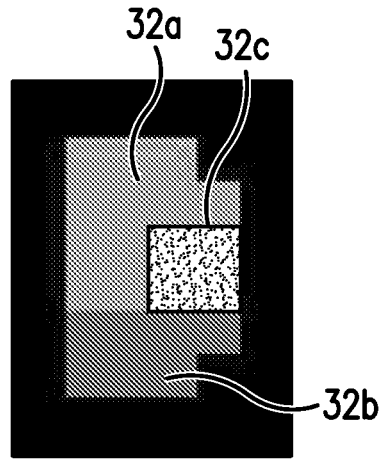
Figure 9D:
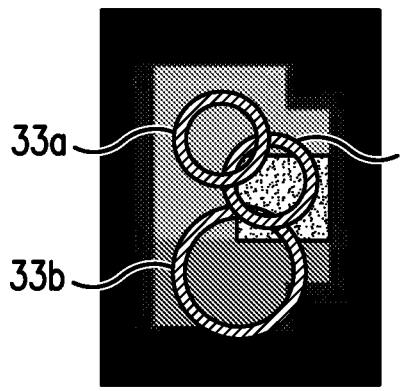
Figure 9E:
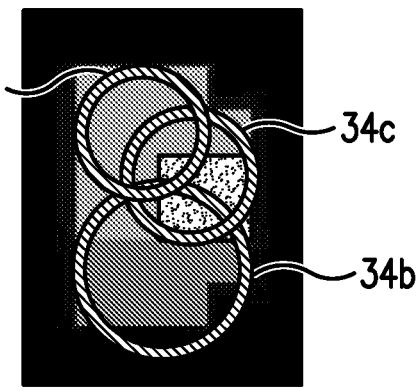

FIGS. 8A-8E illustrate one example of particle identification with multiple EPI's defined in a single support set. In this example, particle identification is performed in the same manner as set forth in FIG. 2, with Steps S201-S203 yielding the same results here. FIGS. 8A-8C are thus identical to FIGS. 3A-3C. However, in this example, a difference arises in the performance of Steps S204-S205, with the recursive iterations of those steps (e.g., S204'-S205') now benefiting from enhanced EPI fitting based on information available from the prior iteration of particle reconstruction. For example, as illustrated in FIG. 8D, when adding EPI's to the support sets 32a/32b, available data from the prior iteration of particle reconstruction may indicate there are in fact three local peaks in the target region 30—with one local peak in the support set 32b and two local peaks in the support set 32a. This would thus correct an improper determination made in the execution of recursive Step S202', wherein there was detected only the two local peaks 31a/31b, as shown in FIG. 8B. With this additional information, recursive Step S204' (FIG. 8D) would now add one EPI 33b in support set 32b based on the local peak 31b detected in recursive Step S202' (FIG. 8B) but would add two EPI's 33a/33c in support set 32a based on the combination of the local peak 31a detected in recursive Step S202' (FIG. 8B) and the additional information informing of the further particle location. Likewise, as illustrated in FIG. 8E, recursive Step S205' would also benefit from the additional information from the prior iteration of particle reconstruction, particularly the further information as to expected particle properties, which would further inform initialization and fitting of each of the EPI's 33a/33b/33c. That is, the additional information would not only inform a more accurate initialization of each EPI, but would also help to distinguish between the two closely positioned EPI's 33a/33c in support set 32a.

In the foregoing example, use of the additional information from the prior iteration of particle reconstruction to determine there are in fact two particle images closely positioned in the support set 32a, and the initializing and fitting of EPI's 33a/33b based on that additional information effectively corrects an overlapping particle image error and prevents the propagation of that error in further steps and iterations of the PTV algorithm 1. It should also be noted that the foregoing example is illustrative of only one manner in which the additional information from the prior iteration may correct an error, and corrections may also be made in other ways. For example, as shown in FIGS. 9A-9E, the additional information from the prior iteration of particle reconstruction might instead result in the earlier detection of a third local peak 31c in recursive Step S202', thereby resulting in the target region 30 being segmented into three support sets 32a/32b/32c in recursive Step S203, with the initialization and fitting of the EPI's 33a/33b/33c each in a single one of the three support sets 32a/32b/32c in recursive Steps S204'-S205'. As with the earlier example, this would likewise correct the same overlapping particle image error.

In both of the foregoing examples, the successive iterations of particle identification, and overall particle reconstruction, may use the additional information from the earlier iteration of particle reconstruction through a three-dimensional concurrence (3DC) algorithm and/or a time-resolved trajectory (TRT) algorithm.

In a 3DC algorithm, a three-dimensional position of a particle may be used to project a two-dimensional position of that particle into a flow image. This may be used when corresponding particle images are found in a number of flow images in a flow image set for a given point in time—though there remains at least one flow image in the same flow image set in which a corresponding particle image was not found. Presuming the identified particle images provide sufficient data to triangulate a three-dimensional particle position, that triangulated position may then be used to calculate a two-dimensional EPI position as to where a corresponding particle image may be located in the one or more flow images in which a particle image was not initially found.

Projection of a two-dimensional EPI position from a three-dimensional particle position may be achieved through use of a mapping function (M), such as $x_j = M^k(X_i)$, where k refers to the given sensor corresponding with the flow image into which a two-dimensional position will be projected, $X_i$ refers to the three-dimensional coordinates of the triangulated particle, and $x_j$ refers to a location in two-dimensional coordinates. A two-dimensional EPI position projected with this equation may then be added as an EPI in a support set of the flow image in question. As the EPI is projected from a particle that has been triangulated from particle images identified in other flow images, the expected particle properties of the triangulated particle may then also be used to identify and match a particle image, assess for potential particle image overlap, and to initialize the corresponding EPI.

Figure 10:
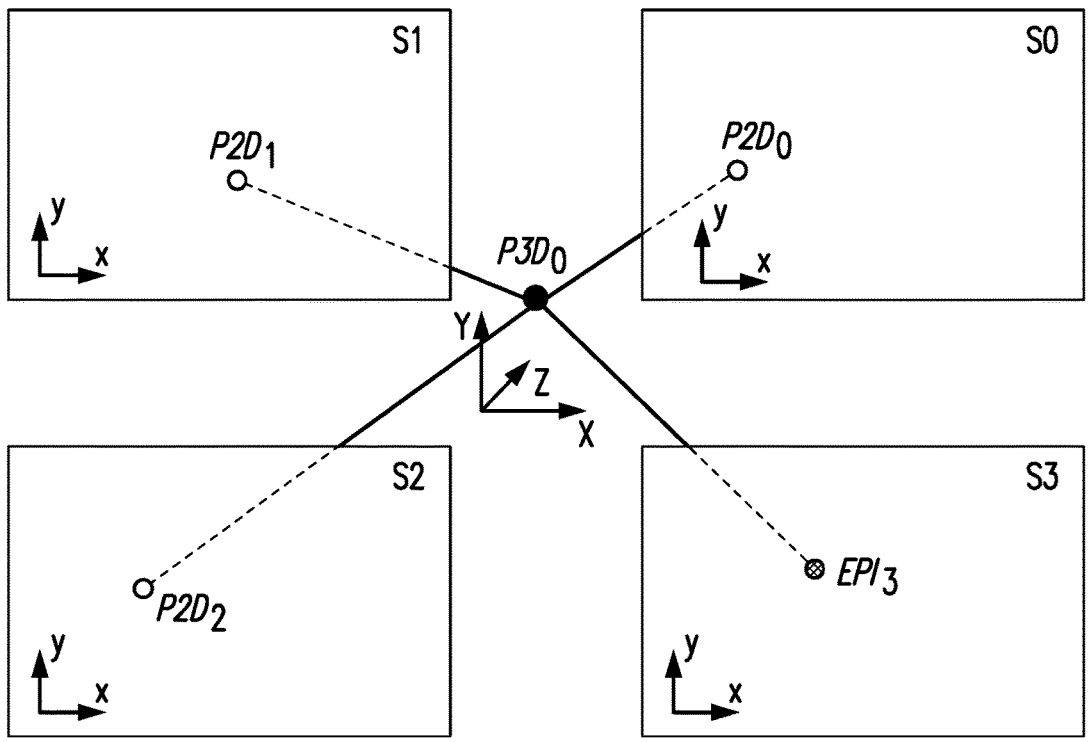
FIG. 10 shows an example of a 3DC sub-algorithm for use in the algorithm of FIG. 1.

FIG. 10 illustrates an example in which a 3DC algorithm is used to project an EPI ($EPI_3$) into a flow image generated by a sensor (S3) from a three-dimensional particle position (P3D0) that was triangulated from three other particle images ($P2D_0$-$P2D_2$) identified in flow images in a common flow image set, though by three other sensors (S0-S2).

The 3DC algorithm may also be used to enhance two-dimensional particle identification via the finding of residual local peaks. For example, a given particle image that was matched and triangulated in a prior iteration may be removed from the corresponding target region in a recursive iteration using the expected particle properties associated therewith. After removing the previously known particle image, the target region may then be researched for any residual local peak intensities in a recursive Step S202'. Any residual local peaks found may then be used, together with the other known local peaks, for the subsequent segmenting of the target region in a recursive Step S203' and in adding and initializing EPI's in recursive Steps S204'-S205'.

In a TRT algorithm, a series of sequential flow images generated over a period of time are chosen for each image sensor, and each sequence of flow images is processed to identify a two-dimensional particle trajectory for a common particle. The two-dimensional particle trajectories are then used to project an EPI location for that common particle, as would be imaged by each sensor in a further flow image. A TRT algorithm may be used when corresponding particle images are found in a number of flow images at sequential points in time—though there remains at least one flow image for a separate point in time in which a corresponding particle image was not found. Presuming the particle images that were found provide sufficient data to plot a two-dimensional particle trajectory, the plotted particle trajectory may then be used to project a two-dimensional EPI position as to where a corresponding particle image may be found in the flow image in which a corresponding particle image was not initially found.

Figure 11:
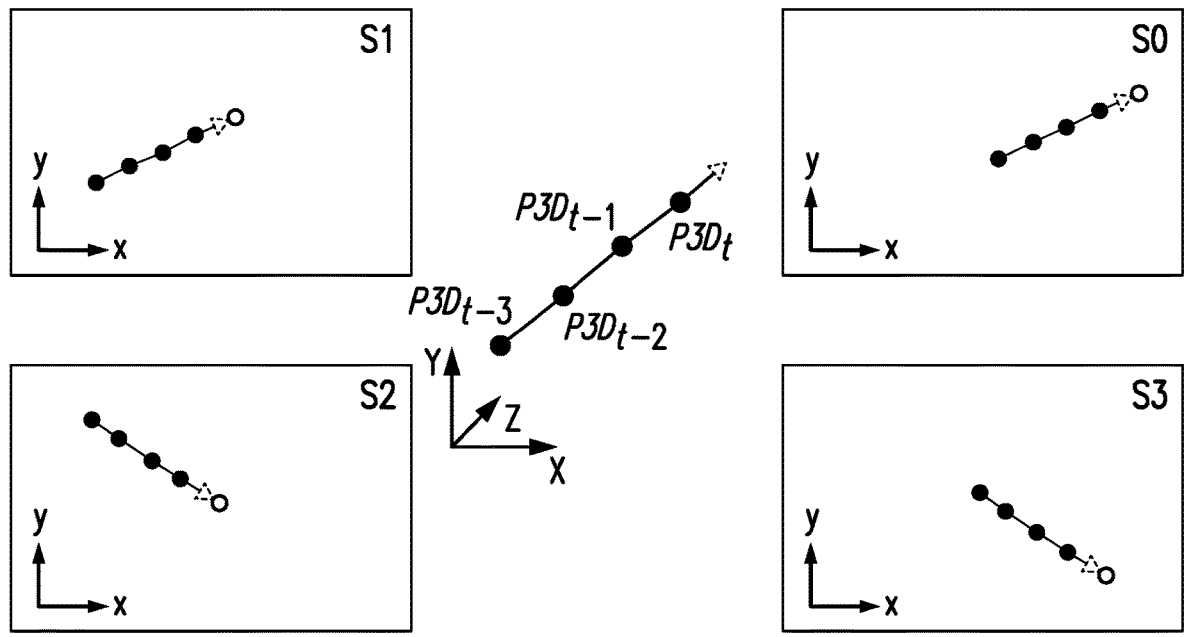
FIG. 11 shows an example of a TRT sub-algorithm for use in the algorithm of FIG. 1.
Figure 12:
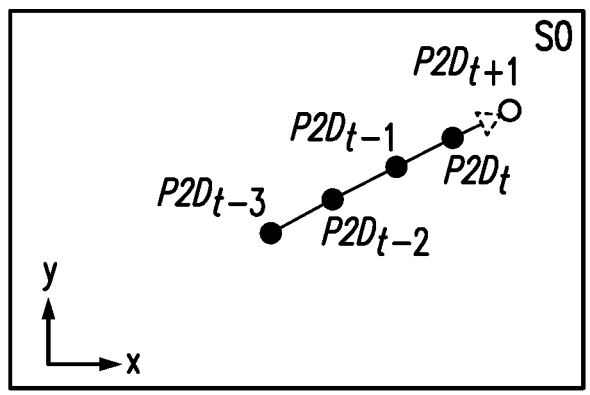
FIG. 12 shows a detailed view of the TRT sub-algorithm in FIG. 11.

FIG. 11 illustrates an example in which a TRT algorithm is invoked to use two-dimensional particle locations (●), as found by four separate sensors (S0-S3), at four successive points in time, to project EPI locations (○) where the four sensors (S0-S3) are expected to find a corresponding particle image in flow images generated for a subsequent point in time. FIG. 12 presents a close-up illustration of such a TRT algorithm, with reference to sensor S0 from FIG. 11.

In FIG. 12, identified particle locations (●) found in flow images recorded at successive moments in time ($P2D_{t-3}$-$P2D_t$) are used to generate a particle trajectory that is then used to calculate a displacement vector and a projected EPI (○) for a subsequent point in time ($P2D_{t+1}$). In addition to calculating the location of a predicted EPI via trajectory, a similar principle is also applied to each of the other expected particle properties (e.g., size, shape, intensity) by fitting a polynomial fit for extrapolating each expected particle property along successive points in time. With this ability to extrapolate the several expected particle properties, there is thus avoided any need for using a mapping function for predicting EPI's.

The foregoing is but one example, and the TRT algorithm may also be used in this same fashion to calculate trajectories and predicted EPI's both forward and backward in time or to assist in identifying particles images that were missed from a trajectory (e.g., such as if the image for time $P2D_{t-2}$ were missing in FIG. 12)

Though FIG. 12 illustrates the TRT algorithm relative to only sensor S0, this process may be performed relative to flow images and particle images for each of the other sensors S1-S3. As the EPI is projected from a trajectory of other identified particle images, the expected particle properties associated with those other identified particle images may also be used to identify and match the particle image, assess for potential particle image overlap, and to initialize and fit corresponding EPI in recursive Steps S204'-205'.

As with the 3DC algorithm, the TRT algorithm may likewise be used to locate particle images that were not identified in prior iterations, which may have resulted from particle image overlap or errors in other steps of particle reconstruction. In addition, the TRT algorithm may also be used to establish projected EPI locations in flow images for successive moments in time, which may enable enhanced particle image identification and matching accuracies in the processing of flow images at each subsequent point in time.

The PTV algorithm may also use variations of the 3DC and TRT algorithms, including a combined TRT/3DC algorithm. For example, with reference to FIG. 11, the triangulated three-dimensional particle locations of a common particle over successive moments in time ($P3D_{t-3}$-$P3D_t$) may be used to generate a three-dimensional trajectory and project a three-dimensional estimated particle location ($P3D_{t+1}$; not shown), which may then be processed with the mapping function, $x_j = M^k(X_i)$, to generate two-dimensional projected EPI's (○) for flow images generated by each of sensors S0-S3.

Overlap ratio is a function of seeding density, therefore, three different seeding densities were utilized with particles per pixel (ppp) of 0.02, 0.05, and 0.1 to calculate the expected overlap ratios. The results are presented in the following Table 1, which shows the percentage lone particle images, and the mean and standard deviations of OVR % for varying seeding density.

TABLE 1

|  | ppp = 0.02 | ppp = 0.05 | ppp = 0.1 |
| --- | --- | --- | --- |
| % Lone | 77.3 | 53.1 | 28.9 |
| Mean OVR % | 44.3 | 47.1 | 51.0 |
| Std. Dev. OVR % | 24.8 | 24.8 | 24.6 |

It is noted that the % Lone parameter denotes particle images with no neighbor (i.e., OVR % ≤ 0). Somewhat surprisingly, even at the high seeding density case (ppp=0.1), almost 30% of particle images are lone particles, but the mean overlap exceeds 50%, which is a critical value where the intensity profile goes from multiple to a single peak.

As mentioned, particle sizing algorithms have three primary steps and in regards to the second step, the segmentation method of Cardwell was adopted to utilize the EDT algorithm thereof for calculating support sets. However, the EDT method was originally utilized to fit a single particle image per support set, not multiple. Also, Cardwell did not use the EDT method with especially high seeding densities.

This is significant because as seeding density increases the support sets of individual particle images will necessarily be made closer to one another, thereby making it difficult to distinguish particle images as well as the associated properties from the support sets. As such, testing was done to determine whether or not EDT segmentation is capable of performing well when multiple particles are to be fit into single support sets.

In the following assessments, the PTV algorithm was implemented and tested with synthetic particle images (particle diameter of three pixels, uniform shape, no sensor noise, and Gaussian light sheet intensity distribution). The Support Ratio ($SR_i$%) for each support set in the image was set as $$SR_i = \frac{n}{D^2} \times 100\%$$

where i=1:N total support sets, D is the particle diameter (pixels) and n is the number of pixels in support set i. The support ratio essentially compares the number of pixels in a support set and the number of pixels expected within a support set, and was not quantified by Cardwell. This value can be calculated for support sets with single or multiple particles therein.

Three different seeding densities were tested at ppp=0.02, 0.05, and 0.1, with the resulting support ratios therefor shown in the following Table 2.

TABLE 2

|  | ppp = 0.02 | ppp = 0.05 | ppp = 0.1 |
| --- | --- | --- | --- |
| Mean SR % | 94.0 | 88.2 | 82.5 |
| Std. Dev. SR % | 11.5 | 15.0 | 16.9 |
| Failure % | 0.2 | 1.2 | 3.4 |

As seen in the table, even for the high seeding density case (ppp=0.1), the mean support ratio is a strong 82.5%, and the failure percentage is low for all cases. The failure percentage is defined as occurrences when the support set contains fewer pixels than is required to perform an EPI fit.

The second assessment made for EDT concerns the number of particle images per support set (also not quantified by Cardwell). While the first assessment concerns retaining necessary pixels for fitting, this test concerns the ability of EDT to segment high seeding densities effectively. One measure of performance for this consideration is to examine the number of particle images within a support set. As the number of particle images per set increases, the greater the challenge for the fitting algorithm to accurately size particle images as multiple solutions to the fit could exist. The following Table 3 shows the number of particle images per support set for the varying seeding densities.

TABLE 3

|  | ppp = 0.02 | ppp = 0.05 | ppp = 0.1 |
| --- | --- | --- | --- |
| $N_{ss} \leq 3$ | 98.7% | 95.7% | 87.2% |
| $N_{ss} \geq 5$ | 0.5% | 0.5% | 3.7% |

As seen in the table, at high seeding densities EDT effectively segments particle images, with 87.2% of support sets containing just three or fewer particle images (96.3% having four or fewer). Higher values of particles per support set is kept low for each seeding density.

The foregoing results show that the EDT method is effective at segmenting particle images at high seeding densities and for multiple particle fitting.

Additional testing was done to assess the least square solver's performance in EPI fitting. Two cases of particle image initialization were used for this testing. In the first case, a problem of consistency was posed by providing perfect initial conditions to various seeding densities of synthetic particle images. In the second case, the solver was challenged by initializing each support set with only the actual number of particle images therein. Initializations for the rest of the parameters came from assumed particle size and local image intensities in the support set. The following Table 4 shows the percentage of successful particle image fitting of both cases.

TABLE 4

|  | ppp = 0.1 |
| --- | --- |
| Case 1 | 98.5% |
| Case 2 | 91.5% |

As seen in the table, at the highest density of ppp=0.1, for the first case the solver fit 98.5% of particle images within 1 pixel of their actual image coordinates. In the second case, the solver was able to correctly size/locate 91.5%.

Figure 13:
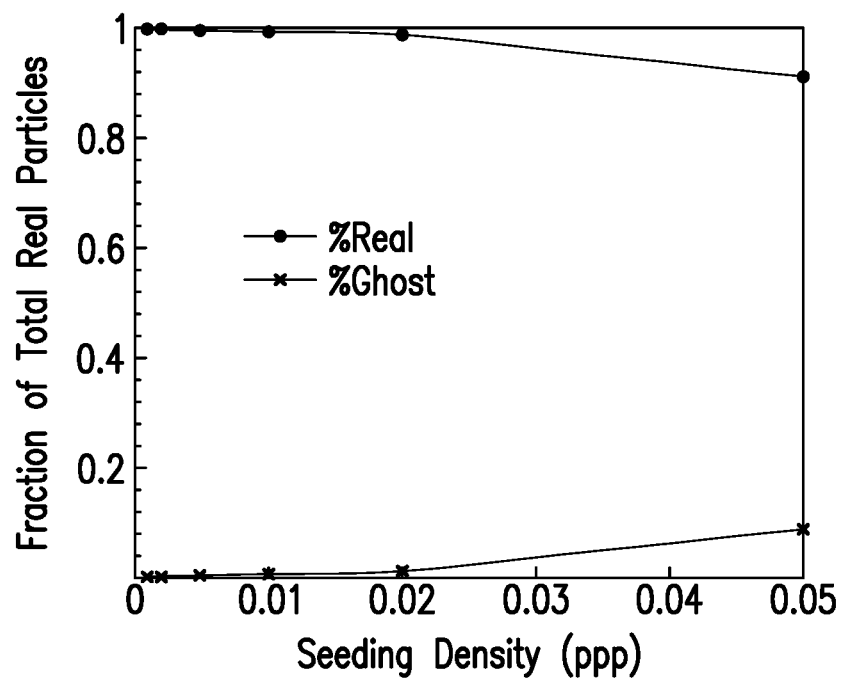
FIG. 13 shows particle detection results with the algorithm of FIG. 1.

In another test, synthetic images were created using four 12-bit sensors with resolution 1000×1000 pixels. The sensors were stationed in a square configuration, each with an optimal Scheimpflug angle. The fields of view were such that the full measurement volume was not seen by each sensor. The particle images diameter was three pixels, uniform shape, no sensor noise, and Gaussian light sheet intensity. For each case, the matching tolerance was set to 0.5 pixels, and increased by 0.2 pixels every four iterations. Six cases were processed under these conditions, with varying seeding densities (quantified by particles per pixels, or ppp). FIG. 13 shows the results of this test, displaying the fractions of reconstructed particles that were real versus those that were ghost 3D particles as a function of seeding density.

As seen from FIG. 13, in cases of sparse and very sparse seeding densities, the recursive algorithm obtains nearly all of reconstructable particles (with negligible ghosts) in two iterations or less. For those cases then, the matching tolerance was 0.5 pixels for each recursion. In the most densely seeded case, ppp=0.05, the percentage of real particles was 95.2% with 5.7% of ghosts in 15 recursions, which equates to a final match tolerance of 1.1 pixels. The accuracy of the reconstructed particles for the case ppp=0.05 was 0.32 pixels (in the 3D sense, accounting for magnification).

The accuracy of EPI particle parameters' prediction is important for the particle identification solver initialization, but not critical since the solver will ultimately calculate (i.e., fit) particle attributes that best match the intensities recorded on the sensor. Regardless, the correctness of the prediction is derived from the accuracy of the trajectory's function fit (e.g., polynomial or spline) to each particle's 2D trajectory.

Testing was done to assess the accuracy of the 2D location prediction for each trajectory, and the solver's ability to locate the particle images. This test was again performed using synthetic particle images (particle diameter of three pixels, uniform shape, no sensor noise, and Gaussian light sheet intensity) at the same seeding densities as previously stated. Two sub-cases were assessed in these tests: [1] constant, unidirectional translation (i.e., uniform flow); and

[2] turbulent flow. Testing was done to determine the effects of varying particle image displacement and function fit.

In the case of uniform flow, a velocity of 0.5 m/s was imposed on the synthetic particles in physical coordinates, which were subsequently mapped to the sensor to create particle images. The time between consecutive frames was dt=2 ms or a repetition rate of 250 Hz, which equated to a particle image displacement of about 10 pixels.

Figure 14:
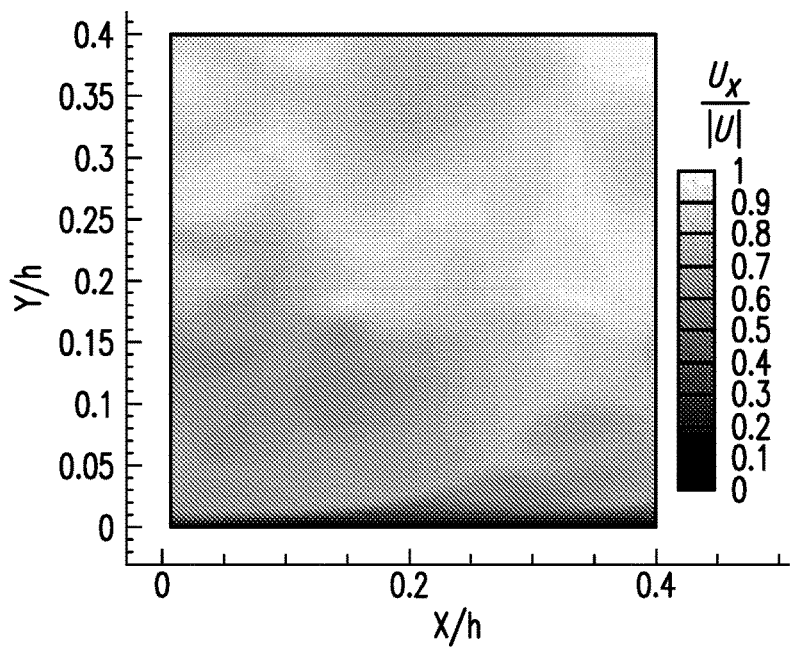
FIG. 14 shows instantaneous velocity contour from simulation of a velocity field in a fluid flow.

In the case of turbulent flow, the John's Hopkins Turbulent Database was utilized for a realistic, synthetic turbulent flow. Details concerning their simulation can be found in Li, Y., et al., "A Public Turbulence Database Cluster and Applications to Study Lagrangian Evolution of Velocity Increments in Turbulence', Journal of Turbulence", 9, 31, 2008—but pertinent to the current study, the bulk velocity was about 0.75 m/s. The dt=3.3 ms, or a repetition rate of about 150 Hz, which equated to a particle image displacement of about 15 pixels. The turbulent velocity field imposed on the synthetic 3D particles was three-dimensional in nature and ranged from 0-0.9 m/s in the primary flow direction. In the wall-normal and transverse directions, velocity magnitudes had a min/max of approximately 20% of the primary velocity component. FIG. 14 highlights instantaneous contours of the primary component of normalized velocity with h being the half-channel height in the simulation.

The following Table 5 shows the mean and standard deviation of errors (in pixels) for the predicted image space values, for both sub-cases for each seeding density, using a second order polynomial fit to four prior consecutive image space locations for each particle image.

TABLE 5

| | Prediction Error (Mean, Std. Dev.), in pixels | | | | | |
| --- | --- | --- | --- | --- | --- | --- |
| | ppp = 0.02 | | ppp = 0.05 | | ppp = 0.1 | |
| Sub-Case | Mean | Std. Dev. | Mean | Std. Dev. | Mean | Std. Dev. |
| Uniform Flow | 0.0023 | 0.06 | 0.0022 | 0.11 | 0.0022 | 0.17 |
| Turbulent Flow | −0.0025 | 0.05 | −0.0030 | 0.13 | −0.0003 | 0.20 |

As seen in the table, prediction errors are lowest for the uniform case—while this might be expected, the errors for the turbulent flow are also quite low. A second order polynomial was chosen due to it providing a superior prediction results when compared to a linear one in both uniform and turbulent flows, but this technique is robust enough to allow for the use of other fitting routines as well.

Calculations were also made of the errors between the actual synthetic particle image locations (i.e., image coordinates) and the measured particle image locations calculated via the nonlinear least squares solver. There were a total of six cases—combinations from two varying flow conditions and three varying seeding densities.

Figure 15A:
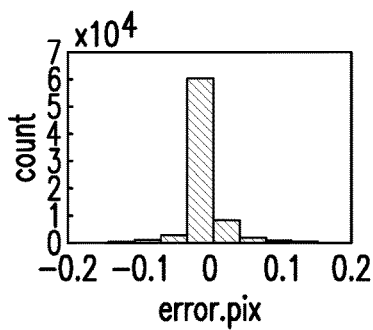
FIGS. 15A-15C show histograms of particle image error for various seeding densities in a uniform fluid flow.
Figure 15B:
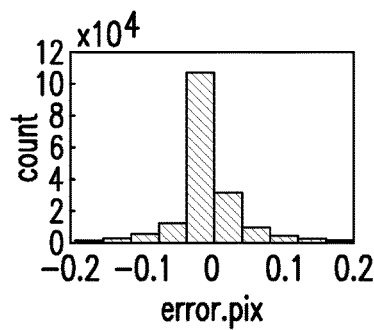
Figure 15C:
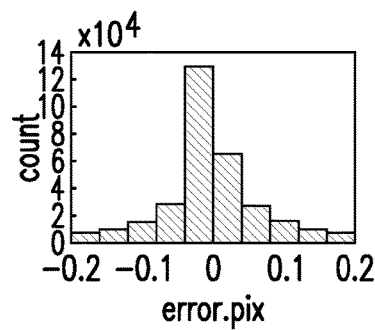

FIGS. 15A-15C displays histograms of particle image centroid error (pixels) for each of the seeding densities of the uniform flow case (a comparable graph for the y-component is not shown for brevity's sake, but the results were similar). The densities and standard deviations for the respective histograms were: FIG. 15A (ppp=0.02; σ=0.06 pixels); FIG. 15B (ppp=0.05; σ=0.11 pixels); and FIG. 15C (ppp=0.1; σ=0.17 pixels). As seen in the figures, the resulting errors were proportional to the seeding density, though low in all cases.

As another assessment of performance, calculation was made as to the number of real particle images were real, that is, how many particle images had a matching synthetic image. For a measured particle image to have a match, a synthetic particle image had to exist within 1 pixel. With this approach, for each density, the total matching percentage of measured particle images in FIGS. 15A-15C was 99.6%, 97.9%, and 94.1%, respectively.

Figure 16A:
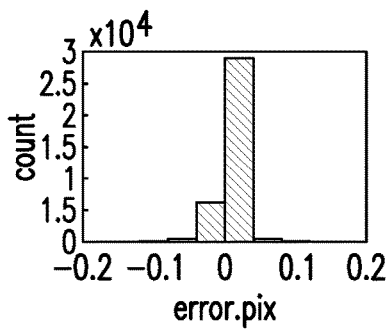
FIGS. 16A-16C show histograms of particle image error for various seeding densities in a turbulent fluid flow.
Figure 16B:
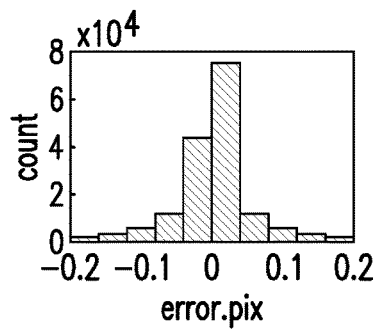
Figure 16C:
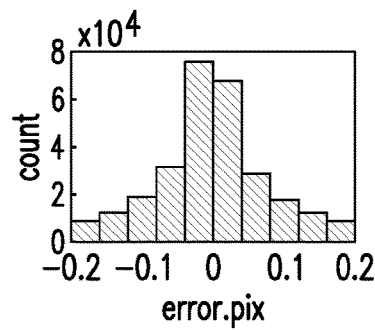

FIGS. 16A-16C display histograms of particle image centroid error (pixels) for each of the seeding densities of the turbulent flow case (a comparable graph for the y-component is not shown for brevity's sake, but the results were similar). The densities and standard deviations for the respective histograms were: FIG. 16A (ppp=0.02; σ=0.05 pixels); FIG. 16B (ppp=0.05; σ=0.13 pixels); and FIG. 16C (ppp=0.1; σ=0.2 pixels). As seen from the figures, similar to the uniform flow case, the resulting errors were proportional to the seeding density, though low in all cases. The total matching percentage of measured particle images in FIGS. 16A-16C was 99.5%, 96.5%, and 92.3%, respectively. The matching percentages are slightly lower for the turbulent flow case, which is likely due to the slightly higher prediction errors.

Figure 17:
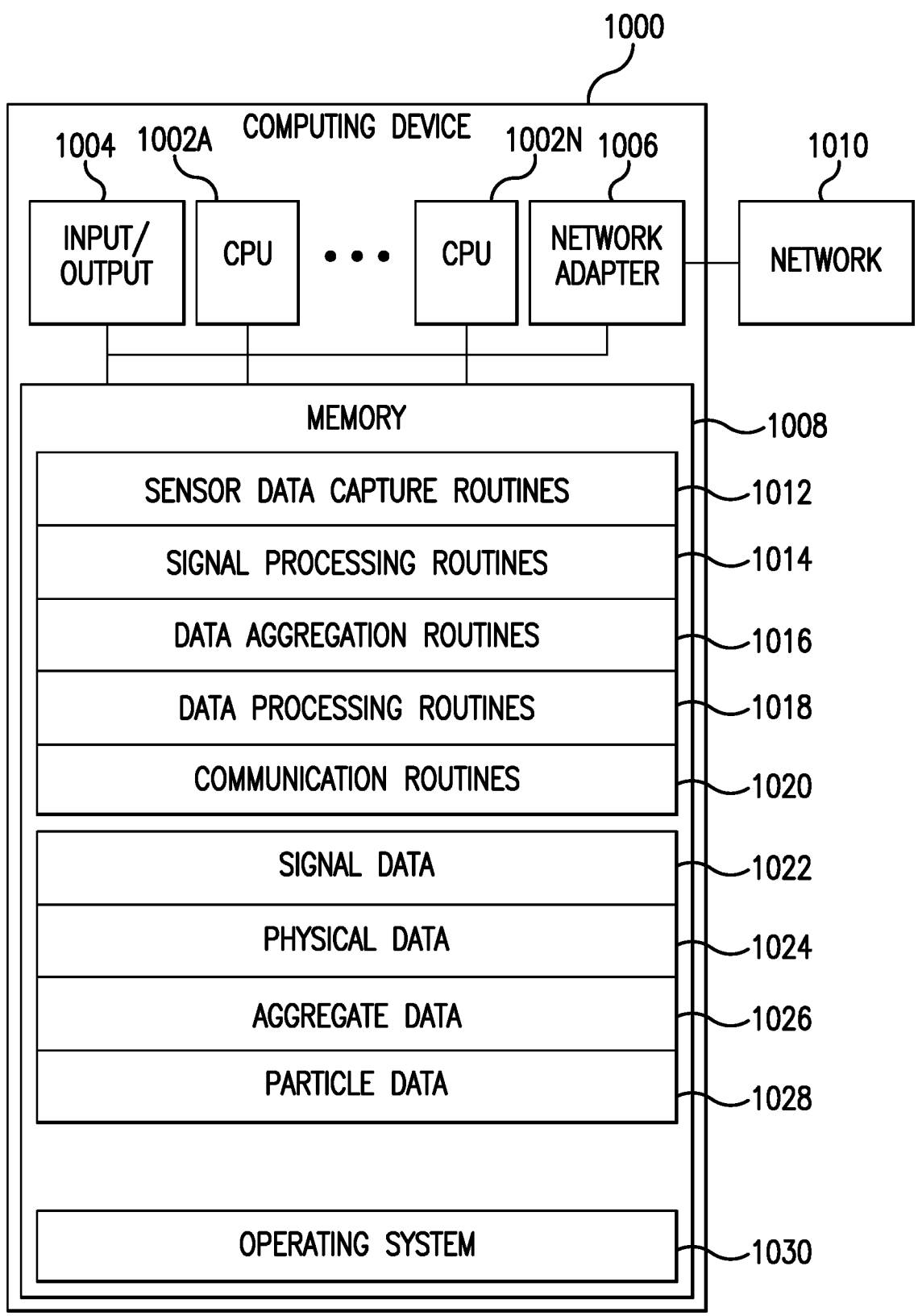
FIG. 17 shows a block diagram example of a computer system 1000 for implementation of the algorithm of FIG. 1.

An exemplary block diagram of a computer system 1000, representative of a 3D-PTV system, in which processes involved in the embodiments described herein may be implemented, is shown in FIG. 17. Computer system 1000 is typically a programmed general-purpose computer system, such as an embedded processor, system on a chip, personal computer, workstation, server system, and minicomputer or mainframe computer. Computer system 1000 may include one or more processors (CPUs) 1002A-1002N, input/output circuitry 1004, network adapter 1006, and memory 1008. CPUs 1002A-1002N execute program instructions in order to carry out the functions of the present invention. Typically, CPUs 1002A-1002N are one or more microprocessors, microcontrollers, processor in a System-on-chip, etc. FIG. 17 illustrates an embodiment in which computer system 1000 is implemented as a single multi-processor computer system, in which multiple processors 1002A-1002N share system resources, such as memory 1008, input/output circuitry 1004, and network adapter 1006. However, the present invention also contemplates embodiments in which computer system 1000 is implemented as a plurality of networked computer systems, which may be single-processor computer systems, multi-processor computer systems, or a mix thereof.

Input/output circuitry 1004 provides the capability to input data to, or output data from, computer system 1000. The input/output circuitry 1004 is adapted for inputting/outputting data from the image sensors S0-S3, as well as any number of other input devices, such as sensors, microphones, keyboards, mice, touchpads, trackballs, scanners, etc., and output devices, such as speakers, video adapters, monitors, printers, etc., and input/output devices, such as, modems, etc. Network adapter 1006 interfaces device 1000 with a network 1010. Network 1010 may be any public or proprietary LAN or WAN, including, but not limited to the Internet.

Memory 1008 stores program instructions that are executed by, and data that are used and processed by, CPU 1002 to perform the functions of computer system 1000. Memory 1008 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1008 may vary depending upon the specific functions that are stored locally on, or remotely from, the computer system 1000. One of skill in the art would recognize that routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 17, memory 1008 may include sensor data capture routines 1012, signal processing routines 1014, data aggregation routines 1016, data processing routines 1018, communication routines 1020, signal data 1022, physical data 1024, aggregate data 1026, particle data 1028, and operating system 1030. For example, sensor data capture routines 1012 may include routines to receive and process signals from sensors, such as those from image sensors S0-S3, to form signal data 1022. Signal processing routines 1014 may include routines to process signal data 1022, as described above, to form physical data 1024. Data aggregation routines 1016 may include routines to process physical data 1024, as described above, to generate aggregate data 1026. Data processing routines 1018 may include routines to process physical data 1024, aggregate data 1026, and/or particle data 1028. Communication routines 1020 may include routines for communication of data between the compute device 1000 and other devices, including other computing devices 1000. Operating system 1030 provides overall system functionality.

Memory 1008 will store the algorithms according to the present invention, including the several steps, sub-process and sub-algorithms thereof—with the specific storage thereof arranged between one or more sub-sections of the memory 1008 as suited for the particular implementation. CPUs 1002A-1002N will communicate with the memory 1008 to execute algorithms according to the present invention.

As shown in FIG. 17, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is akin to an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To the extent necessary to understand or complete the disclosure of the present invention, all publications, patents, and patent applications mentioned herein are expressly incorporated by reference herein to the same extent as though each were individually so incorporated. Also, ranges expressed in the disclosure are presented as shorthand notation for the inclusion of the endpoints of each range, all values in between the endpoints, and all intermediate ranges subsumed by the endpoints as if each were recited individually.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A particle velocimetry system, comprising:
   an input for receiving imaging data from a plurality of two-dimensional image sensors adapted for generating two-dimensional flow images of a three-dimensional particle laden fluid flow;
   a memory storing a particle velocimetry algorithm for tracking the movement of particles in the particle laden fluid flow based on the flow images received from the plurality of image sensors; and
   a processor programmed to execute the particle velocimetry algorithm to track the movement of particles in the particle laden fluid flow based on the flow images received from the image sensors, by:
   executing a particle reconstruction routine to determine three-dimensional positions of particles in the particle laden fluid flow from the flow images received from the image sensors;
   generating a three-dimensional particle distribution from the three-dimensional position data determined by the particle reconstruction routine; and
   executing a recursive loop for iteratively executing the particle reconstruction routine and the generation of three-dimensional particle distributions, with the recursive iteration of the particle reconstruction routine being executed with the use of particle property data obtained from the prior executed iteration of the particle reconstruction routine and/or the generation of three-dimensional particle distributions.

2. The particle velocimetry system according to claim 1, wherein the processor is programmed to execute the particle reconstruction routine by:
performing particle identification to identify two-dimensional particle images in the flow images received from the plurality of image sensors, and to determine two-dimensional positions of the identified particle images;
performing particle matching to match a plurality of particle images identified in a plurality of corresponding flow images on the basis that the matched particle images are determined to correspond to a common particle in the particle laden fluid flow; and
performing particle triangulation to determine three-dimensional positions of particles in the particle laden fluid flow based on the two-dimensional positions of matched particle images.

3. The particle velocimetry system according to claim 2, wherein the processor is programmed, when performing particle identification, to:
identify target regions in the flow images that are determined to contain a particle image based on a first intensity value of pixels in the flow images;
identify in the target regions local peaks that are determined to represent a particle based on a second intensity value of pixels in the flow images;
define support sets of surrounding pixels around the identified local peaks based on commonalities in intensity values in pixels around the local peaks;
add, in each support set, an expected particle image based on bounds of the respective support set and location of the local peak in the respective support set; and
initialize each expected particle image to assign expected particle properties thereto based on properties of pixels at the respective local peak and support set.

4. The particle velocimetry system according to claim 3, wherein the processor is programmed, when matching particle images, to associate the expected particle properties of a given particle image with each other particle image that the given particle image is matched with.

5. The particle velocimetry system according to claim 4, wherein the processor is programmed, when executing a recursive loop, to:
extrapolate a two-dimensional particle trajectory based on a series of associated particle images at successive points in time to identify a two-dimensional particle position of an expected particle image a yet other point in time; and
associate expected particle properties of a particle image at a given point in time in the two-dimensional trajectory with pixels at the two-dimensional particle position identified by extrapolation of the two-dimensional particle trajectory.

6. The particle velocimetry system according to claim 5, wherein the processor is programmed, when performing a recursive iteration of identifying local peaks, to identify a local peak at a pixel based on expected particle properties from a prior iteration of particle reconstruction that have been associated with that pixel based on the extrapolation of the two-dimensional particle trajectory.

7. The particle velocimetry system according to claim 5, wherein the processor is programmed, when performing a recursive iteration of fitting expected particle images, to add a second expected particle image in a support set having another particle image therein based on expected particle properties from a prior iteration of particle reconstruction that have been associated with pixels in the support region based on the extrapolation of the two-dimensional particle trajectory.

8. The particle velocimetry system according to claim 5, wherein the processor is programmed, when performing a recursive iteration of fitting expected particle images, to initialize an expected particle image to assign expected particle properties thereto based on properties of pixels at the respective local peak and support set, wherein the properties of pixels at the respective local peak and support set are inclusive of expected particle properties from a prior iteration of particle reconstruction that have been associated with those pixels based on the extrapolation of the two-dimensional particle trajectory.

9. The particle velocimetry system according to claim 5, wherein the expected particle properties comprise at least one of: particle location, particle size, particle shape, and particle intensity.

10. The particle velocimetry system according to claim 3, wherein the processor is programmed, when triangulating particle images, to associate the expected particle properties of matched particle images with a three-dimensional particle location triangulated from the matched particle images.

11. The particle velocimetry system according to claim 10, wherein the processor is programmed, when executing a recursive loop, to:
project a previously triangulated three-dimensional particle position to identify a two-dimensional particle position of an expected particle image; and
associate expected particle properties of the three-dimensional particle position with pixels at the two-dimensional particle position identified by projection of the three-dimensional particle position.

12. The particle velocimetry system according to claim 11, where
the processor is programmed, when performing a recursive iteration of identifying local peaks, to identify a local peak at a pixel based on expected particle properties from a prior iteration of particle reconstruction that have been associated with that pixel based on the projection of the three-dimensional particle position.

13. The particle velocimetry system according to claim 11, wherein the processor is programmed, when performing a recursive iteration of fitting expected particle images, to add a second expected particle image in a support set having another particle image therein based on expected particle properties from a prior iteration of particle reconstruction that have been associated with pixels in the support region based on the projection of the three-dimensional particle position.

14. The particle velocimetry system according to claim 11, wherein the processor is programmed, when performing a recursive iteration of fitting expected particle images, to initialize an expected particle image to assign expected particle properties thereto based on properties of pixels at the respective local peak and support set, wherein the properties of pixels at the respective local peak and support set are inclusive of expected particle properties from a prior iteration of particle reconstruction that have been associated with those pixels based on the projection of the three-dimensional particle position.

15. The particle velocimetry system according to claim 11, wherein the expected particle properties comprise at least one of: particle location, particle size, particle shape, and particle intensity.

16. The particle velocimetry system according to claim 3, wherein the expected particle properties comprise at least one of: particle location, particle size, particle shape, and particle intensity.

17. The particle velocimetry system according to claim 1, wherein the processor is programmed to implement the particle velocimetry algorithm to execute an initial iteration of the particle reconstruction routine and generation of a three-dimensional particle distribution, and at least one recursive iteration of the particle reconstruction routine and generation of a three-dimensional particle distribution.

18. The particle velocimetry system according to claim 17, wherein the processor is programmed to implement the particle velocimetry algorithm to execute recursive iterations of the particle reconstruction routine and generation of a three-dimensional particle distribution for a predetermined number of iterations.

19. The particle velocimetry system according to claim 18, wherein the processor is programmed to implement the particle velocimetry algorithm to execute recursive iterations of the particle reconstruction routine and generation of a three-dimensional particle distribution until a threshold variation in positional data of the three-dimensional particle distribution is reached.

20. The particle velocimetry system according to claim 1, wherein the property data comprises particle location, particle size, particle shape, and particle intensity.

\* \* \* \* \*